United States Patent
Jung et al.

(10) Patent No.: US 8,400,431 B2
(45) Date of Patent: Mar. 19, 2013

(54) METHOD TO IMPROVE PERFORMANCE OF A PROPORTIONAL AREA WEIGHTED SENSOR FOR TWO-DIMENSIONAL LOCATIONS ON A TOUCH SCREEN

(75) Inventors: David Hann Jung, Fremont, CA (US); John Nolting, San Jose, CA (US)

(73) Assignee: Integrated Device Technology Inc., San Jose, CA (US)

( * ) Notice: Subject to any disclaimer, the term of this patent is extended or adjusted under 35 U.S.C. 154(b) by 260 days.

(21) Appl. No.: 12/975,687

(22) Filed: Dec. 22, 2010

(65) Prior Publication Data

US 2012/0127131 A1 May 24, 2012

Related U.S. Application Data

(60) Provisional application No. 61/416,231, filed on Nov. 22, 2010.

(51) Int. Cl.
*G06F 3/041* (2006.01)
(52) U.S. Cl. ............... 345/178; 345/173; 178/18.01
(58) Field of Classification Search .......... 345/173–178; 178/18.01–18.09
See application file for complete search history.

(56) References Cited

U.S. PATENT DOCUMENTS

| | | | |
|---|---|---|---|
| 2006/0097991 A1* | 5/2006 | Hotelling et al. | 345/173 |
| 2006/0284856 A1* | 12/2006 | Soss | 345/173 |
| 2008/0259044 A1* | 10/2008 | Utsunomiya et al. | 345/173 |
| 2010/0013774 A1* | 1/2010 | Chen et al. | 345/168 |
| 2010/0045615 A1* | 2/2010 | Gray et al. | 345/173 |
| 2010/0156810 A1* | 6/2010 | Barbier et al. | 345/173 |
| 2010/0259504 A1* | 10/2010 | Doi et al. | 345/174 |

\* cited by examiner

*Primary Examiner* — Amare Mengistu
*Assistant Examiner* — Premal Patel
(74) *Attorney, Agent, or Firm* — Hayes and Boone LLP

(57) ABSTRACT

An electronic appliance including a processor and a computer-readable medium, having instructions for execution by a processor is provided. The instructions causing the processor to perform methods to obtain an error map for locations in a touch sensor. The method including inputting a geometry for a touch sensor layout; inputting coordinates for centroids of sensing elements in the touch sensor layout; and inputting a touch geometry. The method includes the steps of selecting a plurality of test points on the touch sensor layout; generating, a calculated touch location for each of the plurality of test points; and an error map from the calculated touch locations and the test points. The method may include generating an error measure from the error map; displaying, the generated error map and the generated error measure; and adjusting the geometry for the touch sensor layout if the error measure is larger than a tolerance value.

15 Claims, 18 Drawing Sheets

1

METHOD TO IMPROVE PERFORMANCE OF A PROPORTIONAL AREA WEIGHTED SENSOR FOR TWO-DIMENSIONAL LOCATIONS ON A TOUCH SCREEN

RELATED APPLICATIONS

This application claims priority to U.S. Provisional Application No. 61/416,231, filed on Nov. 22, 2010, which is hereby incorporated by reference in its entirety. Moreover, this application is related to U.S. patent application Ser. No. 12/975,666, filed on Dec. 22, 2010, entitled "Proportional Area Weighted Sensor for Two-Dimensional Locations on a Touch Screen," by David Hann Jung and U.S. patent application Ser. No. 12/975,707, filed on Dec. 22, 2010, entitled "Touch Sensor Having Improved Edge Response," by John Nolting and David Hann Jung. The contents of both of these applications are also hereby incorporated by reference in their entirety.

BACKGROUND

1. Technical Field

Embodiments disclosed herein relate to the field of touch sensors and, more specifically, to conductive element patterns on touch sensors and methods of determining touch locations with such conductive element patterns and algorithms to test the performance of touch sensors.

2. Description of Related Art

Modern electronic devices often have touch sensors to receive input data. There are a variety of types of touch sensor applications, such as touch sensors, digitizers, touch buttons, touch switches, touch scroll bars, and other similar devices.

Conventional touch sensors based on capacitive coupling use conductive plates typically made of Indium Tin Oxide (ITO) or some other transparent material that is electrically conductive. Several conductive elements separated by a dielectric may be placed in the plane of a sensor panel to detect the position of a touch. Typically, capacitive touch sensors require multiple layers of Indium Tin Oxide (ITO) to detect multiple touches. Some conventional touch sensors may use a single ITO layer, but they are not capable of determining the location of multiple simultaneous touches in more than a single direction due to the way the single ITO layer is disposed on the touch sensor. Moreover, touch sensors using a single ITO run into accuracy and precision issues for two-dimensional (2D) positioning. This typically occurs due to the conventional geometries used for the conductive elements in the ITO layer. There are conductive elements that produce more accurate 2D location by using new geometries. Examples of conductive elements using new geometries are shown in U.S. patent application Ser. No. 12/543,277, filed Aug. 18, 2009 and assigned to Integrated Device Technology, Inc., which is incorporated herein by reference in its entirety. These conductive elements using the new geometries result in a linear change of capacitance as a touch moves from one conductive element to an adjacent conductive element. While these conductive elements have been successful, there may be a loss of location accuracy at the edges of the sensor panel where linearity of the capacitance changes may fail.

What is needed is a touch sensor that more accurately determines the position of touches on a touch-sensitive panel. Likewise, there is a need for touch sensor controllers that are capable of determining the position of a plurality of simultaneous touches along the two dimensions of a touch-sensitive panel.

BRIEF SUMMARY

An electronic appliance including a processor, a computer-readable medium, an input device, and a display device according to embodiments disclosed herein may include a computer-readable medium having instructions for execution by a processor. The instructions when executed causing the processor to perform a method to obtain an error map for locations in a touch sensor. In some embodiments disclosed herein, the method may include the steps of inputting, using the input device of the electronic appliance, a geometry for a touch sensor layout; inputting, using the input device of the electronic appliance, coordinates for a centroid of sensing elements in the touch sensor layout; and inputting, using the input device of the electronic appliance, a touch geometry. Further, the method may include the steps of selecting, using the input device of the electronic appliance, a plurality of test points on the touch sensor layout; generating, by the processor of the electronic appliance, a calculated touch location for each of the plurality of test points; and generating, by the processor of the electronic appliance, an error map from the calculated touch locations and the test points. Further, in some embodiments the method may include the step of generating, by the processor of the electronic appliance, an error measure from the error map; displaying, on a display device coupled to the electronic appliance, the generated error map and the generated error measure; and adjusting, using the input device of the electronic appliance, the geometry for the touch sensor layout if the error measure is larger than a tolerance value.

These and other embodiments will be described in further detail below, with reference to the following drawings.

BRIEF DESCRIPTION OF THE DRAWINGS

Wherever possible, the same reference numbers are used throughout the drawings to refer to the same or like elements.

DETAILED DESCRIPTION

Figure 1:
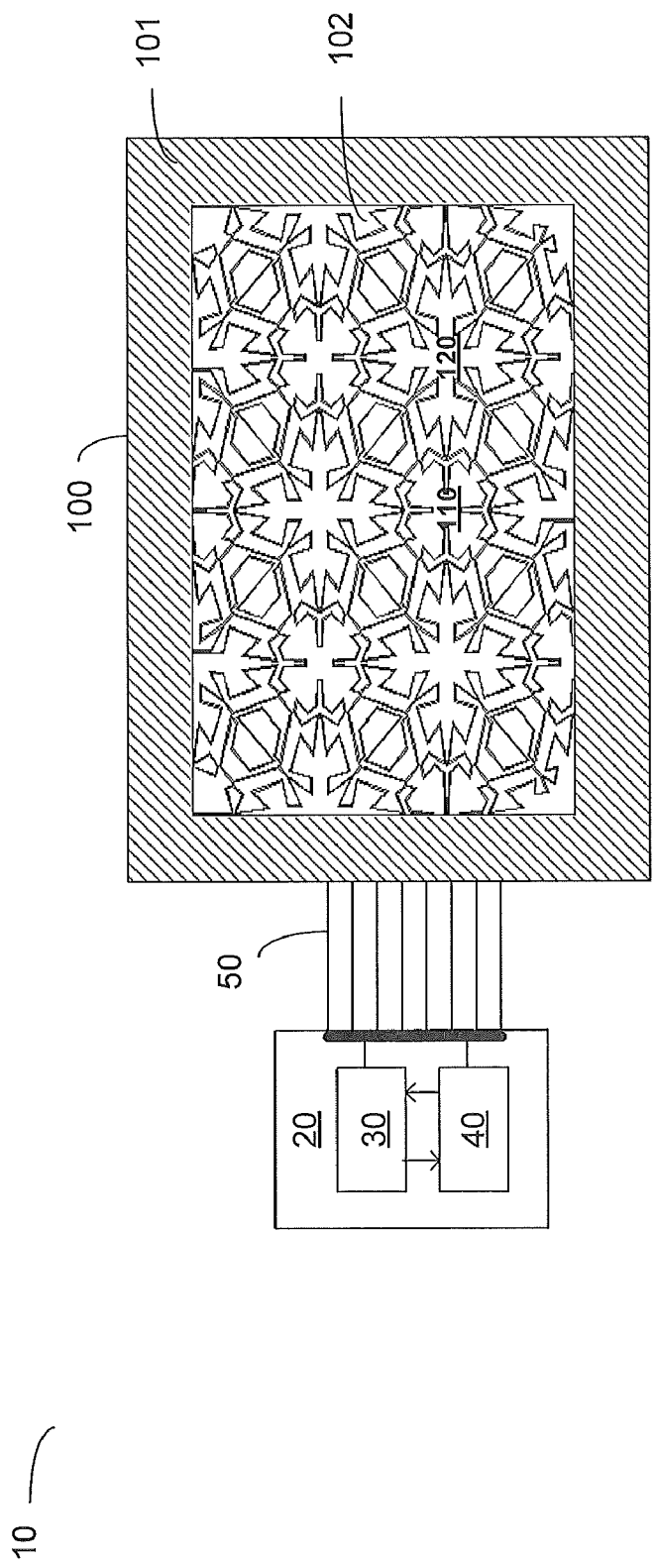
FIG. 1 shows a touch screen device for two dimensional locations according to some embodiments.

Touch sensors on screen panels may be of a variety of types, such as resistive, capacitive, and electro-magnetic types. A capacitive touch sensor is coated with a conductive material, typically Indium Tin Oxide (ITO), aluminum or copper, which conducts continuous electrical current across a sensor element. The sensor exhibits a precisely controlled field of stored charge in both the horizontal ('X') and vertical ('Y') axes of a display, to achieve capacitance. The human body is also an electrical device which has stored charge and therefore exhibits capacitance. When the sensor's normal capacitance field (its reference state) is altered by another capacitance field, e.g., by the touch or near touch (hereinafter, touches will also include near touches unless otherwise noted) of a person, capacitive touch sensors measure the resultant distortion in the characteristics of the reference field and send the information about the touch event to a touch controller for mathematical processing. There are a variety of types of capacitive touch controllers, including Sigma-Delta modulators (also known as capacitance-to-digital converters—CDCs—), charge transfer capacitive touch controllers, and relaxation oscillator capacitive touch controllers.

Touch screen sensing using single layer technology can achieve greater physical positional accuracy on either of two ways. One way is to increase the number of sensor elements which results in a reduction of their size. This approach may be expensive to implement due to the higher pin count required of the touch controller. Furthermore, there are physical limitations imposed on the number of wire connections or 'leads' that may be driven into each sensing element from the edges of the panel. For example, there may be a limitation on how narrow a conducting wire on a glass or other dielectric surface may be, before conductivity is affected. This becomes especially taxing if the intention is to obtain a touch screen panel using a single conductive layer.

Another approach may be to optimize the shapes of the sensor elements such that better location accuracy may be obtained by using fewer elements. By choosing an appropriate shape, elements occupying areas away from the edges of the screen panel may also have portions close to the edges. Thus, the number and length of leads stretching from the edge of the screen panel to its interior portions may be reduced. One strategy to further optimize the placement of leads to sensor elements is the use of pass-through traces and jumpers. In this strategy, an element may be split into two pieces so that a pass-through trace reaching an element further in the interior of the panel may be placed in between the two pieces. The two pieces, which may be disconnected in the screen panel, may then be connected via a jumper in the circuitry outside of the active area of the sensor layout.

In embodiments disclosed herein, a proportionally weighted area of sensor elements is used for determining location in two dimensions. According to some embodiments, a linear relation may apply between the change in capacitance of a touched sensor element and the area of the touch in the sensor element. By measuring the change in capacitance, the area of the touch overlapping a sensing element may be compared with the area overlapping other sensing elements. The ratio of the area overlap with each element to the total touch area may be calculated to form an overlap proportion. The overlap proportion may have a relation to the position of the center of the touch event relative to the center of each overlap element. In some embodiments this relation may be linear.

The performance of a capacitive touch screen consistent with embodiments disclosed herein may depend on the size of the touch area contacting the screen. In fact, some embodiments may have a layout of sensing elements which is optimized for operation with a specific touch area. For example, some embodiments may function with higher 2D location accuracy for a round touch having 2 mm in diameter. While embodiments consistent with this disclosure may also operate for circular touches ranging in diameter from 2 mm to 18 mm, some embodiments may be optimized for touches having a 12 mm diameter. The suitable touch diameters for various embodiments may vary outside this range depending on the number of sensors and the size of the touch screen, or the needs of the application. The touch may be a contact with a human finger, or a suitable device providing a capacitive contact to the sensing elements, such as a stylus.

Embodiments described herein may be used in single layer capacitive touch screen technology. Other technologies using proportionally weighted area sensor elements for 2D location may also use embodiments as disclosed herein.

FIG. 1 shows touch screen device 10 for providing two-dimensional touch locations according to some embodiments. Touch screen device 10 may include a touch controller 20 having a processor circuit 30 and a memory circuit 40. Controller 20 is coupled to a touch screen layout 100 through connector 50. Touch screen layout 100 is the touch surface for a user using touch screen device 10. Consistent with some embodiments, a user touches the touch surface of touch screen layout 100, and a two-dimensional location of the user touch will be determined by touch controller 20. Screen layout 100 may include sensing elements 110 and 120 covering the entire area of layout 100, without overlapping each other. Connector 50 may be a flex cable including a wire connector for each of the sensing elements 110 and 120 included in layout 100. In some embodiments, layout 100 may include an edge portion 101, and an interior portion 102. Interior portion 102 may be completely covered by elements 110 and 120, and may include at least one entire piece of at least one element 110 or 120. Edge portion 101 may also be covered by non-overlapping sensing elements. Sensing elements in edge portion 101 may include at least fragments of elements 110 and 120 which are not overlapping each other. Edge portion 101 is also coupled electrically to controller 20 through connector 50. In some embodiments consistent with FIG. 1, portion 101 may have non-overlapping sensing elements that have different shapes from portions or fragments of elements 110 or 120.

Figure 2:
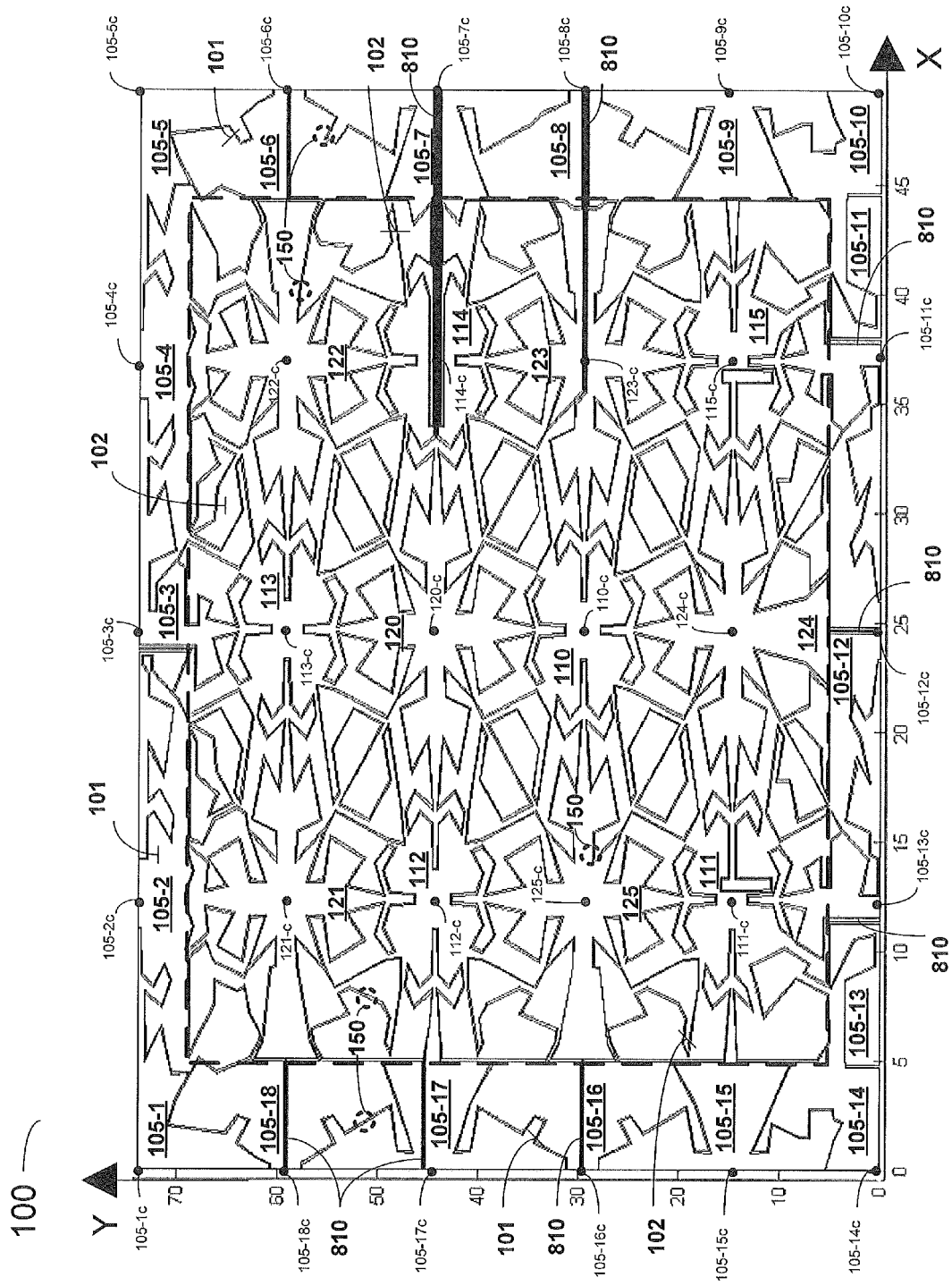
FIG. 2 shows a touch screen layout of conductive sensor elements for a single layer touch screen, according to some embodiments.

FIG. 2 shows touch screen layout 100 of conductive sensor elements for a single layer touch screen, according to some embodiments. According to FIG. 2, two basic designs may be used for sensing elements 110 and 120. The two designs 110 and 120 may complement each other, as shown in FIG. 2. In addition, interior portion 102 of layout 100 may include interior sensing elements 111-115 and interior sensing elements 121-125. Elements 111-115 may be partially similar to element 110, and elements 121-125 may be partially similar to element 120. Edge portion 101 may also include edge sensing elements 105-1 to 105-18. According to some embodiments such as illustrated in FIG. 2, elements 105-1 to 105-18 may complement each other so that the entire area of portion 101 is covered by sensing elements. Some of sensing elements 105-1 to 105-18 may contain portions similar to the design of element 110 or element 120. Some sensing elements 105-1 to 105-18 may be different to element 110 and element 120, and also to each other, according to some embodiments. Furthermore, in some embodiments, elements 105-1 to 105-18 may be partially included inside portion 102. For example, elements 105-2, 105-4, 105-6, 105-7, 105-8, 105-9, 105-10, 105-11, 105-12, 105-13, 105-14, 105-15, and 105-17 may have some area included in portion 102.

Sensing elements 110-115, 120-125, and 105-1 to 105-18 are interlaced so that they may fill a 2D plane, of which layout 100 is a rectangular piece. Sensing elements 110-115, 120-125, and 105-1 to 105-18 are made of a conductive material, such as ITO, and may be deposited on a dielectric plate forming the background of layout 100. Each of sensing elements 110-115, 120-125, and 105-1 to 105-18 may thus be separated from all neighbors by a gap 150 of dielectric material. Thus, the capacitive effect of each sensing element in layout 100 may be decoupled from one another. Furthermore, sensing elements 110-115, 120-125, and 105-1 to 105-18 may form a first terminal of a capacitor coupled to controller 20 (cf. FIG. 1). A second terminal of the capacitor may be a finger or a capacitive element making contact with the sensing element by overlapping it. The capacitor thus formed between each of sensing elements and the touch element may be coupled to controller 20. The coupling may be realized using pass-through terminals 810 connecting sensing elements 110-115, 120-125, and 105-1 to 105-18 with controller 20 through connector 50 (cf. FIG. 1). The patterns and shapes shown in FIG. 2 are not limiting, other designs consistent with the layout and proportionality of sensing elements to a touch depicted in FIG. 2 may be used.

In FIG. 2 sensing elements 110-115 have centroids 110c-115c; sensing elements 120-125 have centroids 120c-125c; and sensing elements 105-1 to 105-18 have centroids 105-1c to 105-18c. While sensing elements 110 and 120 may be completely embedded in portion 102, elements such as 111 to 115 and 120 to 125 may have edge portions trimmed or altered from the original shape of elements 110 and 120, as illustrated in FIG. 2. For example, in some embodiments element 125 may be identical to element 120 except for the left arm, which in element 125 becomes a widening branch up to the edge between portions 101 and 102. Likewise, element 115 may be identical to element 110, except that the right and bottom edges may be altered in shape so that element 115 may be entirely included interior portion 102.

For elements 110 and 120, centroids 110c and 120c correspond to the true geometric center of the element. Some embodiments consistent with FIG. 2 may be such that centroids 111c to 115c and 121c to 125c are placed on the centroids of the untrimmed or unaltered sensing elements.

For elements 105-1 to 105-18 included in edge portion 101, centroids 105-1c to 105-18c may be placed along the outer edge of layout 100 as illustrated in FIG. 2. Centroids 105-1c to 105-18c may not correspond to the geometric center of elements 105-1 to 105-18. Additional mathematical adjustments may be applied to the location of the centroids to achieve better accuracy. The positions of centroids 110c-115c, 120c-125c, and 105-1c to 105-18c may be stored in memory 40 of controller circuit 20.

According to FIG. 2, an 'X-Y' coordinate system may be oriented along the horizontal-vertical edges of layout 100. The unit of measure for the markings in coordinate system 'X-Y' may be mm (millimeters). Embodiments of layout 100 consistent with FIG. 2 may include a number of sensing elements varying according to the size of the touch screen being used. Some embodiments may include layout 100 for a 2"×3.5" screen having 42 pieces corresponding to about 30 sensing elements. The number of pieces may be larger than the number of sensing elements because a pass-thru trace may split a sensor element in two pieces. Each of the two pieces may be part of the same sensing element, coupled together in edge portion 101. However on layout 100, the two pieces may appear disconnected. The center of elements 110 and 120 may be located with a different pitch on the X-axis from that of the Y-axis. The X-axis and Y-axis are referred in the directions shown in FIG. 2. For example, in the embodiments depicted in FIG. 2 the X-axis pitch may be 12.3 mm and the Y-axis pitch may be 14.78 mm.

In embodiments consistent with FIG. 2 elements 110-115, and 120-125 occupy a substantial area of portion 102 and have portions near edge portion 101. This allows in some embodiments to have relatively short pass-through traces 810 coupling sensing elements 110-115 and 120-125 in interior portion 102. The intricate pattern of elements 110-115, 120-125, and 105-1 to 105-18 is such that wide area portions may be adjacent to narrow area portions in each element along the 'X' and 'Y' directions. Thus, the width of the element may change non-monotonically along X and Y directions, from the center of the element. Furthermore, elements 110-115, 120-125, and 105-1 to 105-18 are such that when placed next to each other there may be a continuous gap 150 between each element at every point along adjacent edges. According to embodiments as depicted in FIG. 2, gap 150 may be the same at every point along adjacent edges. In some embodiments, gap 150 may vary slightly, remaining nearly constant within a few percent along adjacent edges. Furthermore, elements 110-115 may be placed adjacent to one another and also form a continuous gap 150 between their edges. While element 110 may be adjacent to any one of elements 110-115, and also an element 120, element 120 may be adjacent to elements 110-115 only. For example, element 110 in FIG. 2 may be adjacent to elements 120, 123-125, and 111, 112, 114 and 115. Element 120 in FIG. 2 may be adjacent to elements 110, 112, 113 and 114, only.

Embodiments of layout 100 consistent with FIG. 2 may include elements 110-115, 120-125, and 105-1 to 105-18 being substantially interlaced. This means that for all or mostly all sensing elements included in layout 100, it is true that for at least two points A and B inside an element, the line joining points A and B may not be completely contained within that element. Furthermore, interlaced elements 110-115 and 120-125 in layout 100 are such that there is at least one point C inside the element for which a straight line joining point C with the centroid of the element crosses over a neighboring element at least once.

Figure 3:
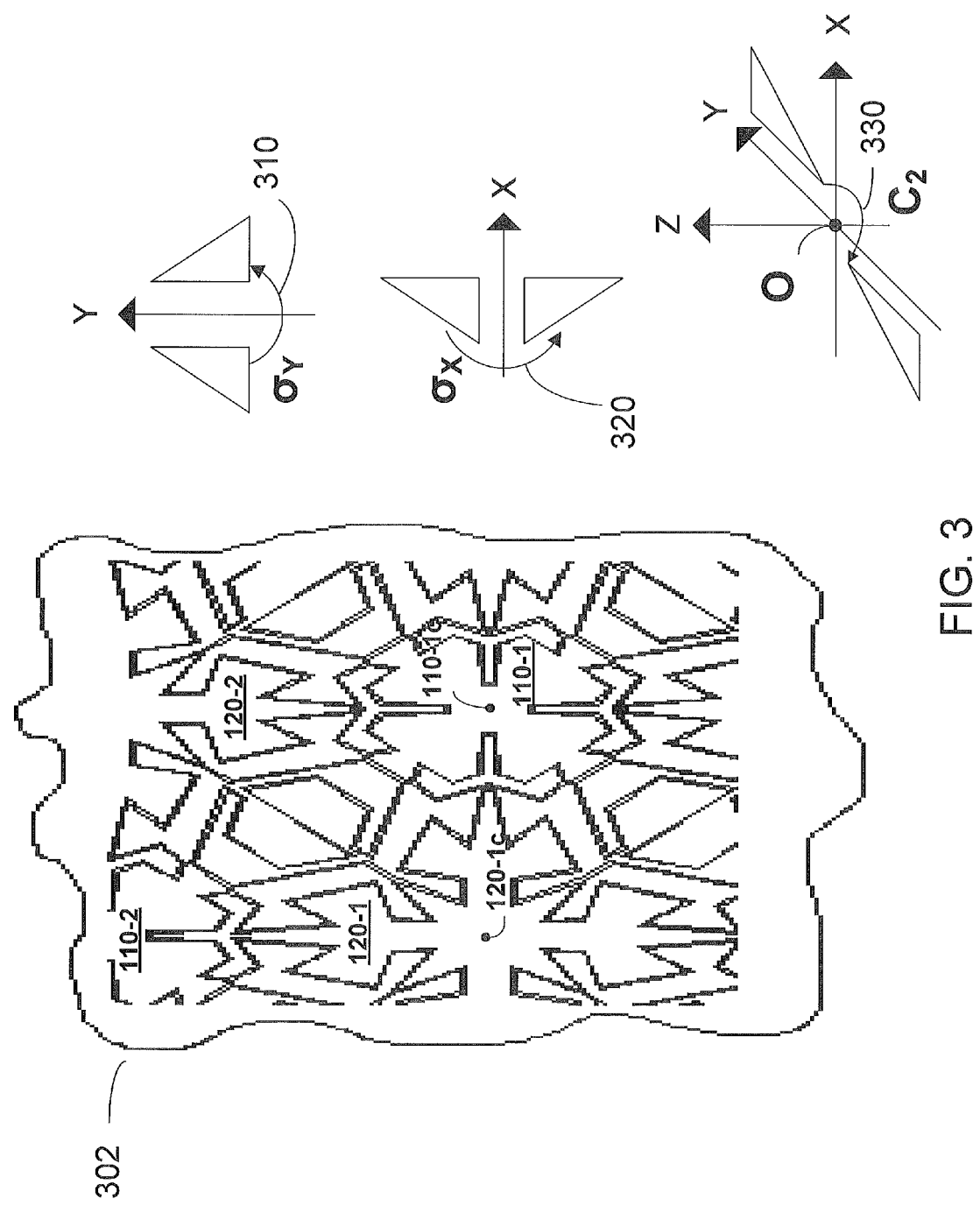
FIG. 3 shows a cutaway of the layout in FIG. 2, illustrating layout symmetries, according to some embodiments.

FIG. 3 shows a cutaway of inner portion 302 in layout 100 according to embodiments consistent with FIG. 2. Portion 302 in FIG. 3 may include elements 110-1 and 110-2, and elements 120-1 and 120-2. Elements 110-1 and 110-2 have the shape of element 110 in FIG. 2, and elements 120-1 and 120-2 have the shape of element 120 in FIG. 2. FIG. 3 illustrates the symmetries of sensing elements 110 and 120, according to some embodiments. The symmetry is based on the shape of elements 110 and 120 without including pass-through traces 810. Symmetry 310 ($\sigma_y$) is a mirror reflection about the Y-axis on the plane of layout 100. Symmetry 320 ($\sigma_x$) is a mirror reflection about the X-axis on the plane of layout 100. Symmetry 330 ($C_2$) is a rotation by 180° about the Z-axis, perpendicular to the plane of layout 100. According to FIG. 3, it is seen that patterns 110 and 120 forming layout 100 are invariant under operations $\sigma_y$ 310, $\sigma_x$ 320, and $C_2$ 330. As a result, portion 302 formed by placing patterns 110 and 120 adjacent to one another may also be invariant under operations $\sigma_y$ 310, $\sigma_x$ 320, and $C_2$ 330. Note that symmetries 310, 320, and 330 are defined in terms of the 'X-Y' coordinate system illustrated in FIG. 3. The coordinate origin O may be placed on centroid 110-1c for element 110-1, or on centroid 120-1c for element 120-1. In some embodiments consistent with FIG. 3, symmetry axes 'X' and 'Y' may be chosen parallel to the edges of layout 100. Symmetry operations $\sigma_x$, $\sigma_y$, and $C_2$ together with the identity operation, E, form a group, called the dihedral group, $D_2$. Discrete point symmetry groups of a 2D plane may include a $D_2$ symmetry group.

By comparing FIGS. 2 and 3 it is seen that sensing elements 110 and 120 in FIG. 2 may include symmetries 310, 320, and 330 about centroids 110c and 120c, respectively. Not all sensing elements in layout 100 may include these symmetries. Moreover, embodiments of layout 100 such as illustrated in FIG. 2 may include more symmetric elements in interior portion 102 than in edge portion 101. In fact, some embodiments may have elements 110 and 120 including symmetries 310, 320 and 330 in portion 102, and elements 105-1 to 105-18 including none of the symmetries 310, 320 and 330, in portion 101. Furthermore, while elements 110 and 120 in portion 102 may contain symmetries 310, 320 and 330, other elements in portion 102 may not. For example, element 125 in FIG. 2 includes symmetry 320 but not symmetry 310 nor 330. Also, some embodiments consistent with FIG. 2 may include elements having shapes that satisfy any one of the symmetries 310, 320 and 330 at least approximately. For example, element 122 in FIG. 2 may not satisfy symmetry 320 exactly, but it satisfies the symmetry approximately. Thus, overlapping element 122 in FIG. 2 with its mirror image upon symmetry 320 may cover a substantial portion of the area of element 122. This overlapping portion may be 90% or more.

Note that embodiments of layout 100 such as illustrated in FIGS. 2 and 3 may have an aspect ratio different from one (1) between the 'X' and 'Y' dimensions (X-Y aspect ratio). For example, in FIGS. 2 and 3 the diameter of elements 110 and 120 through their centroids may be smaller in a direction parallel to the X-axis than in a direction parallel to the Y-axis. This configuration relaxes the symmetry restrictions on layout 100, and may be chosen for screen geometries appropriate for a given application. For example, a palm-based device may use an X-Y aspect ratio smaller than one (1), with the 'X' and 'Y' axes as shown in FIG. 2. Other desktop- and laptop-based devices may use an X-Y aspect ratio larger than one (1). Some embodiments may use layout 100 having an X-Y aspect ratio of one (1). Further, embodiments of layout 100 such as illustrated in FIGS. 2 and 3 may have "shapes" and "patterns" created by the sensor elements that differ from those shown in FIGS. 2 and 3.

Figure 4:
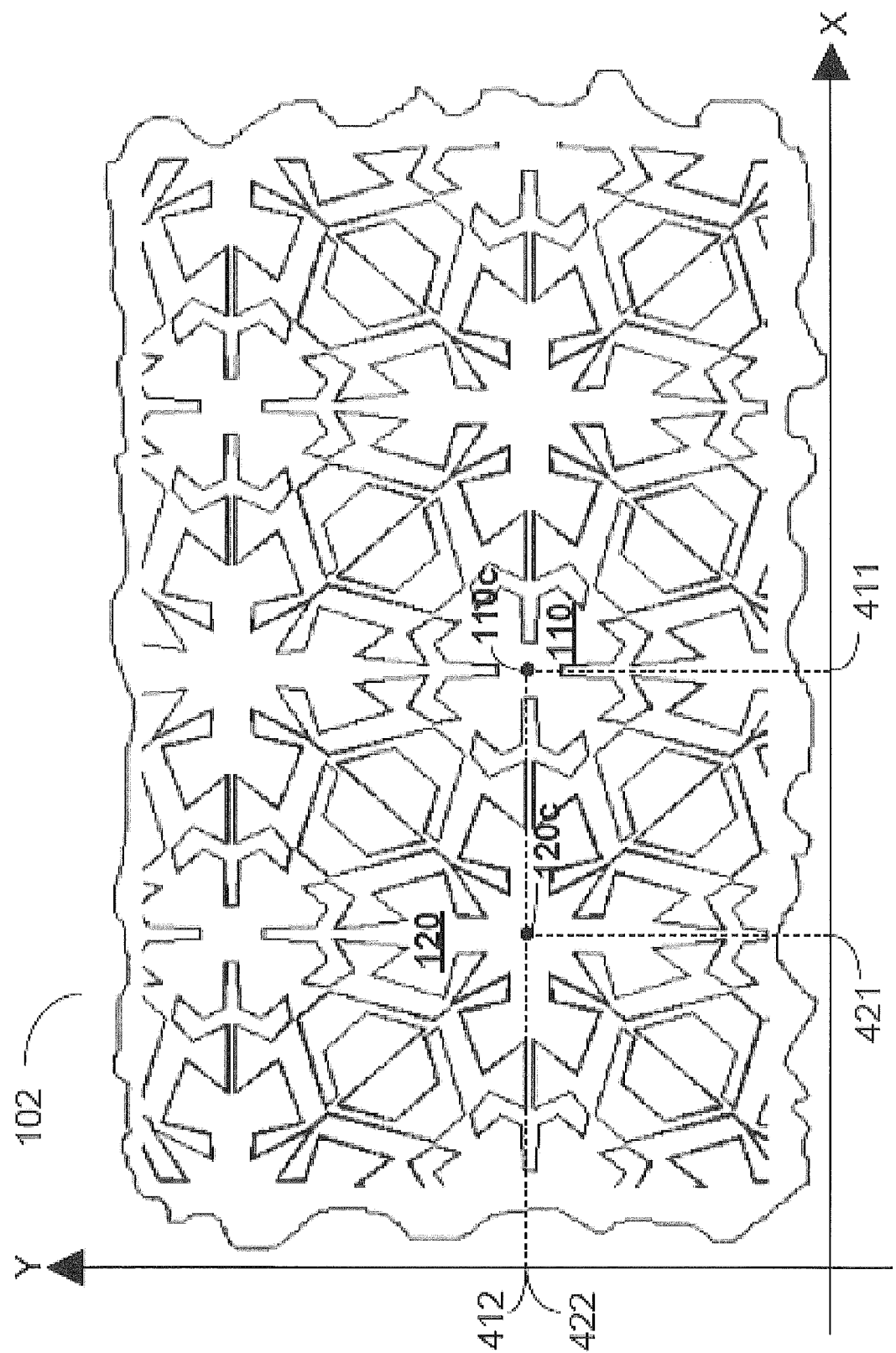
FIG. 4 shows a cutaway of the layout in FIG. 2, illustrating the centroids of the sensor elements, according to some embodiments.

FIG. 4 shows a cutaway of layout 100 illustrating centroids 110c and 120c of elements 110 and 120, respectively. Centroid 110c of element 110 has X-coordinate 411 and Y-coordinate 412. Centroid 120c of element 120 has X-coordinate 421 and Y-coordinate 422.

Figure 5:
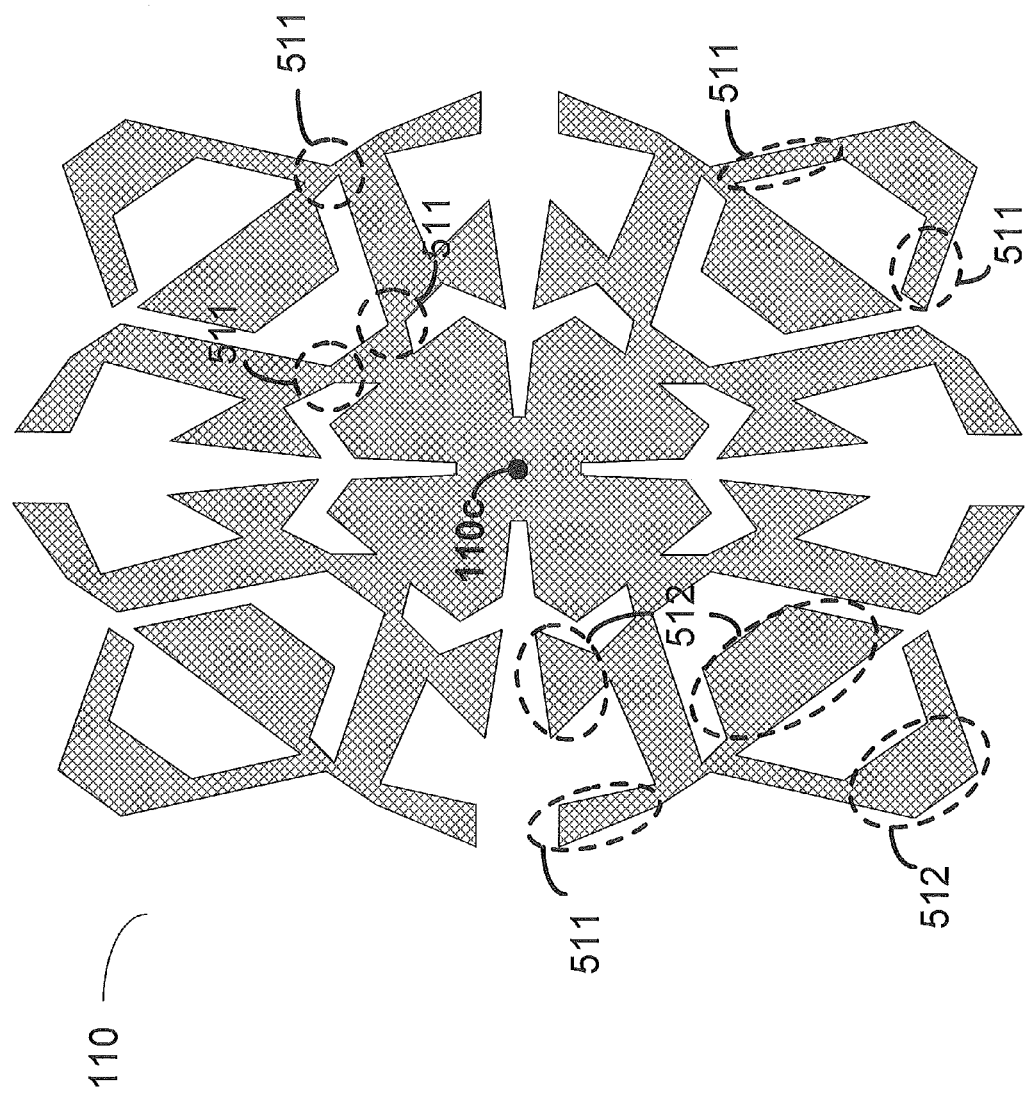
FIG. 5 shows a sensor element used in the layout of FIG. 2 having the symmetry shown in FIG. 3, according to some embodiments.

FIG. 5 shows sensor element 110 used in layout 100 having symmetries 310, 320, and 330 (FIG. 3) about centroid 110c, according to some embodiments. Element 110 in FIG. 5 may include narrow area portions 511 next to wide area portions 512. According to the embodiment depicted in FIG. 5, area portions 511 and 512 may be placed such that as a touch area is moved across element 110 in a direction away from centroid 110c, narrow area portions 511 and wide area portions 512 are encountered. Thus, the overlap proportion for element 110 may not vary monotonically as a touch area is moved across element 110. For example, if a touch area is centered on point 110c and moves along a direction forming 45° with the X-axis, the overlap proportion may decrease first, then increase, then decrease, increase again, and finally decrease down to zero as the touch area leaves the perimeter of element 110. The behavior of an overlap proportion may be different for touch areas moving in different directions and not passing through centroid 110c. Embodiments consistent with FIG. 5 are such that a non-monotonic variation of the overlap proportion results for touch areas moving substantially in any direction on the plane including layout 100.

Figure 6:
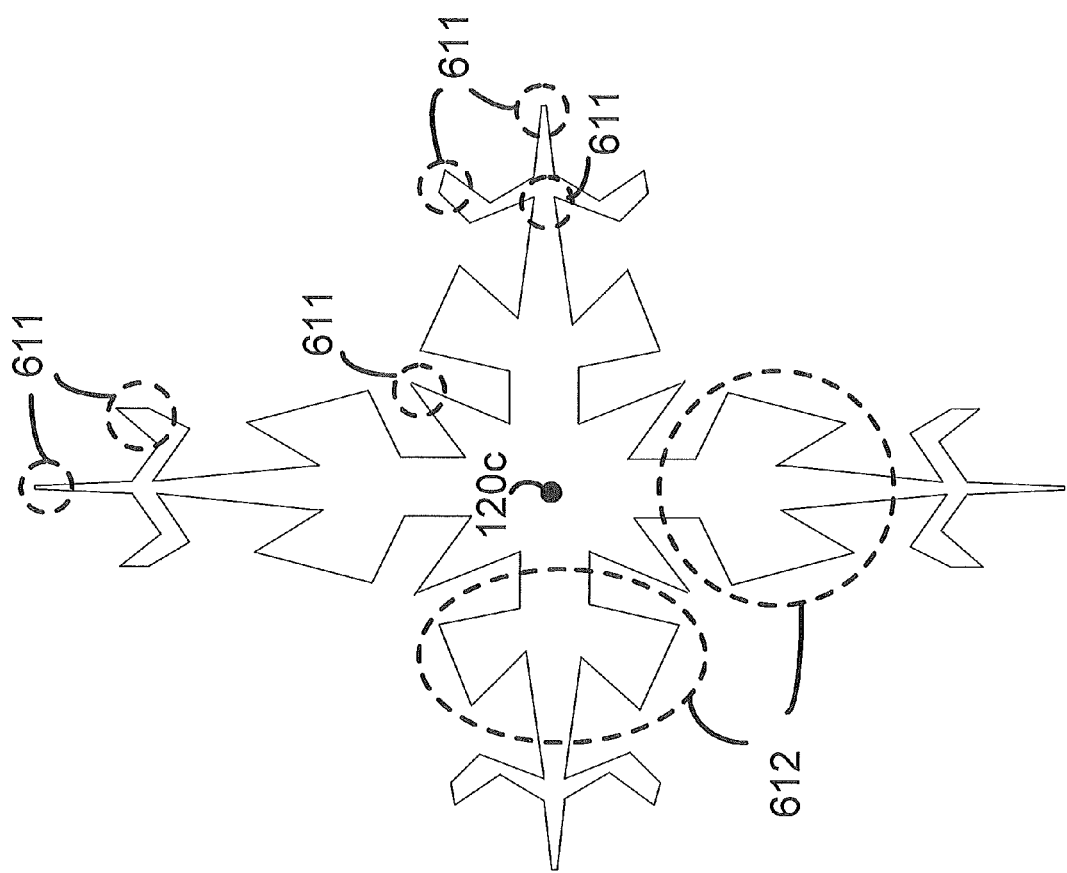
FIG. 6 shows a sensor element used in the layout of FIG. 2 having the symmetry shown in FIG. 3, according to some embodiments.

FIG. 6 shows sensor element 120 used in layout 100 having symmetries 310, 320, and 330 about centroid 120c (FIG. 3), according to some embodiments. Element 120 in FIG. 6 may include narrow and sharp area portions 611 next to wide area portions 612. According to the embodiment depicted in FIG. 6, area portions 611 and 612 may be placed such that as a touch area is moved across element 120 in a direction away from centroid 120c, narrow and sharp area portions 611 and wide area portions 612 are encountered. Thus, the overlap proportion for element 120 may not vary monotonically as a touch area is moved across element 120. For example, if a touch area is centered on point 120c and moves along a direction parallel to the X-axis the overlap proportion may decrease first, then increase, then decrease, increase again, and finally decrease down to zero as the touch area leaves the perimeter of element 120. The behavior of an overlap proportion may be different for touch areas moving in different directions and not passing through centroid 120c. Embodiments consistent with FIG. 6 are such that a non-monotonic variation of the overlap proportion results for touch areas moving substantially in any direction, on the plane including layout 100.

In embodiments consistent with FIGS. 5 and 6 narrow portions 511 and 611 may include sharp edges and narrow troughs formed of a conductive material such as ITO. Physical limitations may apply as to how narrow these elements may be, before conductivity throughout elements 110 and 120 may be affected. Also, there may be technical limitations to form elements 110 and 120 in a narrow shape having a sharp angle profile. For example, if an ITO layer is being deposited on a glass surface via sputtering, there may be resolution limitations imposed by the sputtering technique used. Thus, some embodiments may have rounded edges instead of sharp tips or "gulfs," in portions 511, 512, 611 or 612.

Figure 7:
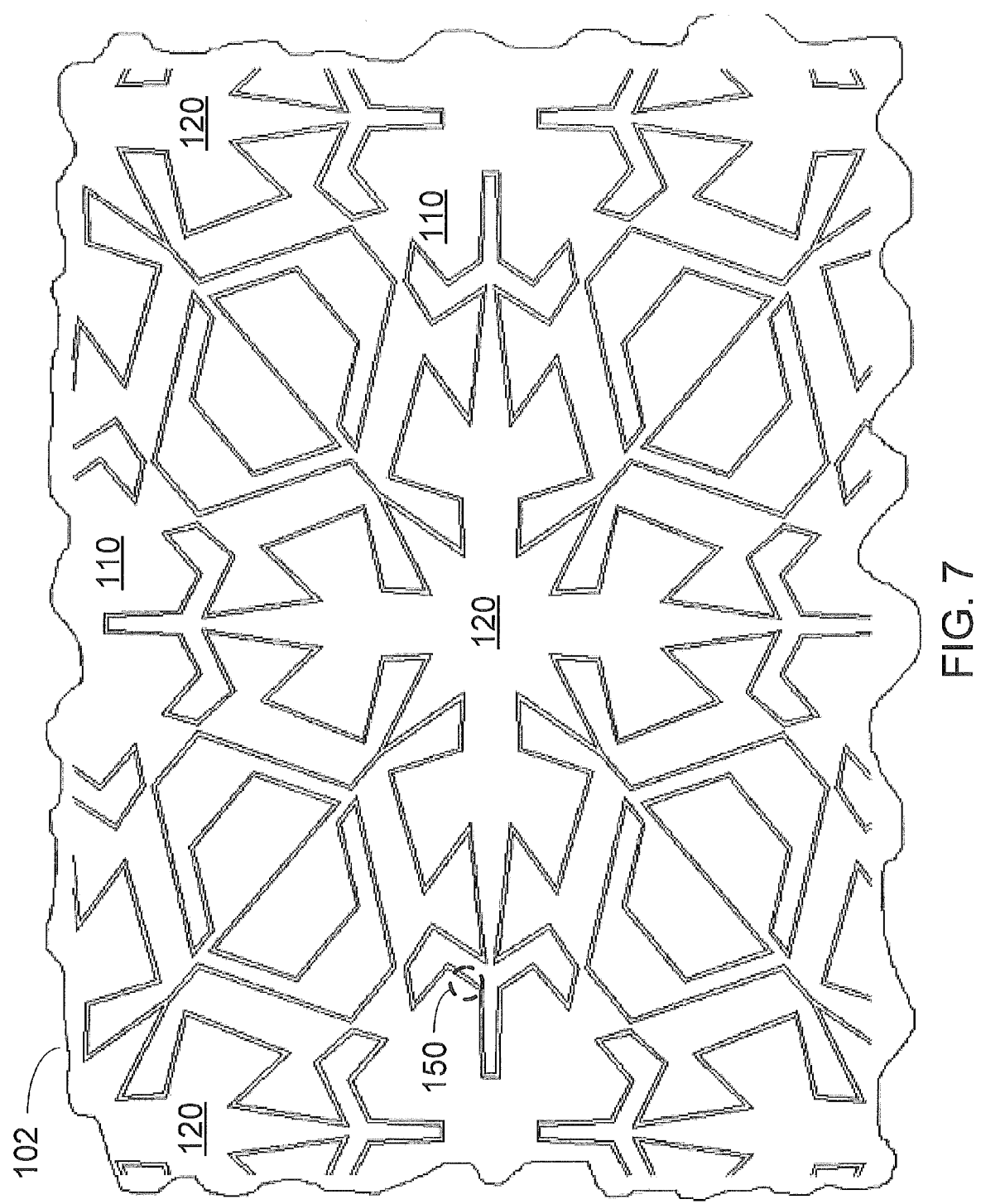
FIG. 7 shows a layout of conductive sensor elements for a single layer touch screen as in FIG. 2, wherein elements are separated from each other by a minimum gap, according to some embodiments.

FIG. 7 shows interior portion 102 for a single layer touch screen, wherein elements 110 and 120 are separated from each other by minimum gap 150, according to some embodiments. It may be desirable to have gap 150 be equal at every point on the edges of elements 110 and 120. Furthermore, it may be desirable for gap 150 to be as narrow as possible, so that the total area covered by gap 150 in layout 100 is minimal as compared to the area of sensing elements 110 and 120. In some embodiments, gap 150 may be chosen as minimal in comparison to the touch area for the sensor.

Given the material and the techniques of forming sensing elements 110 and 120, there may be physical limitations as to how narrow gap 150 may be. For example, according to sputtering techniques for ITO on glass, gap 150 may be as narrow as a few hundred μm's (1 μm=$10^{-6}$ m), or even 100 μM. Some embodiments may use other techniques and different conductive materials to form sensing elements 110 and 120, resulting in different values for gap 150. Other factors that may affect the thickness of gap 150 may be the capacitive coupling between sensing elements 110 and 120. In some embodiments it may be desirable to reduce the capacitive coupling between each of sensing elements forming layout 100. That is, it may be desirable to have sensing elements whose capacitance is completely independent from each other. In general, the narrower gap 150 is, the larger the coupling between adjacent elements in layout 100 may become. Capacitive coupling between adjacent sensing elements 110 and 120 may also be determined by the dielectric properties of the material on which the elements are deposited.

Figure 8:
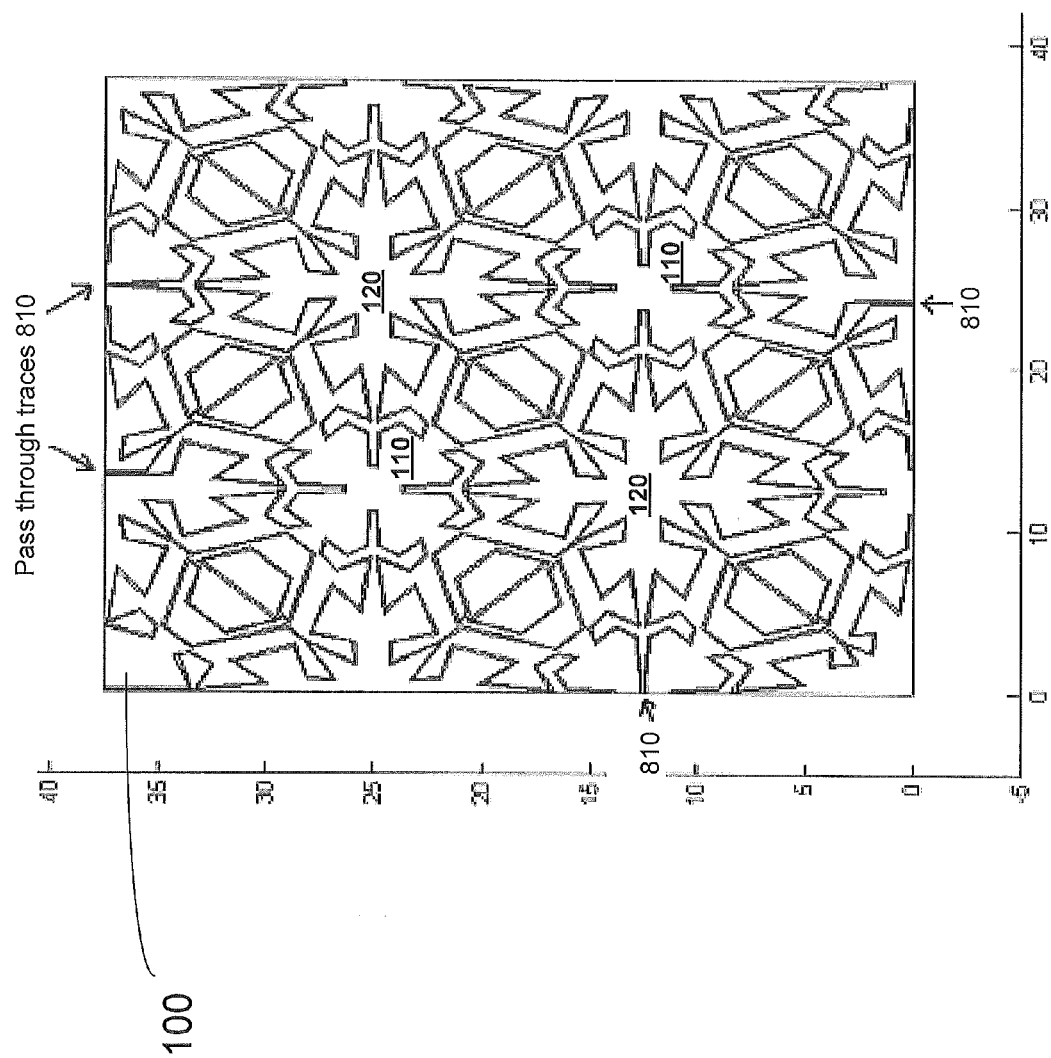
FIG. 8 shows a layout of conductive sensor elements for a single layer touch screen as in FIG. 2, including pass-through traces, according to some embodiments.

FIG. 8 shows layout 100 for a single layer touch screen including pass-through traces 810, according to some embodiments. Traces 810 may allow sensing elements 110 and 120 located in the interior portion 102 of layout 100 to be reached through the edges of layout 100. Traces 810 may couple sensing elements 110 and 120 to controller 20 located outside of layout 100 (cf. FIG. 1). According to embodiments consistent with FIG. 8, traces 810 may be formed in the same conducting layer as sensing elements 110 and 120. Thus, a touch screen sensor may be formed in a single conductive layer deposited on a dielectric substrate. It may be desirable for traces 810 to be as narrow as possible so that the total area of layout 100 covered by traces 810 be minimal. On the other hand, it is desirable that traces 810 provide effective electrical conductance to a sensing element in interior portion 102. According to some embodiments, the thickness of traces 810 may be the same or similar to the thickness of gap 150 (cf. FIG. 7). A detailed explanation of the layout of traces 810 is provided in relation to FIG. 9, as follows.

Figure 9:
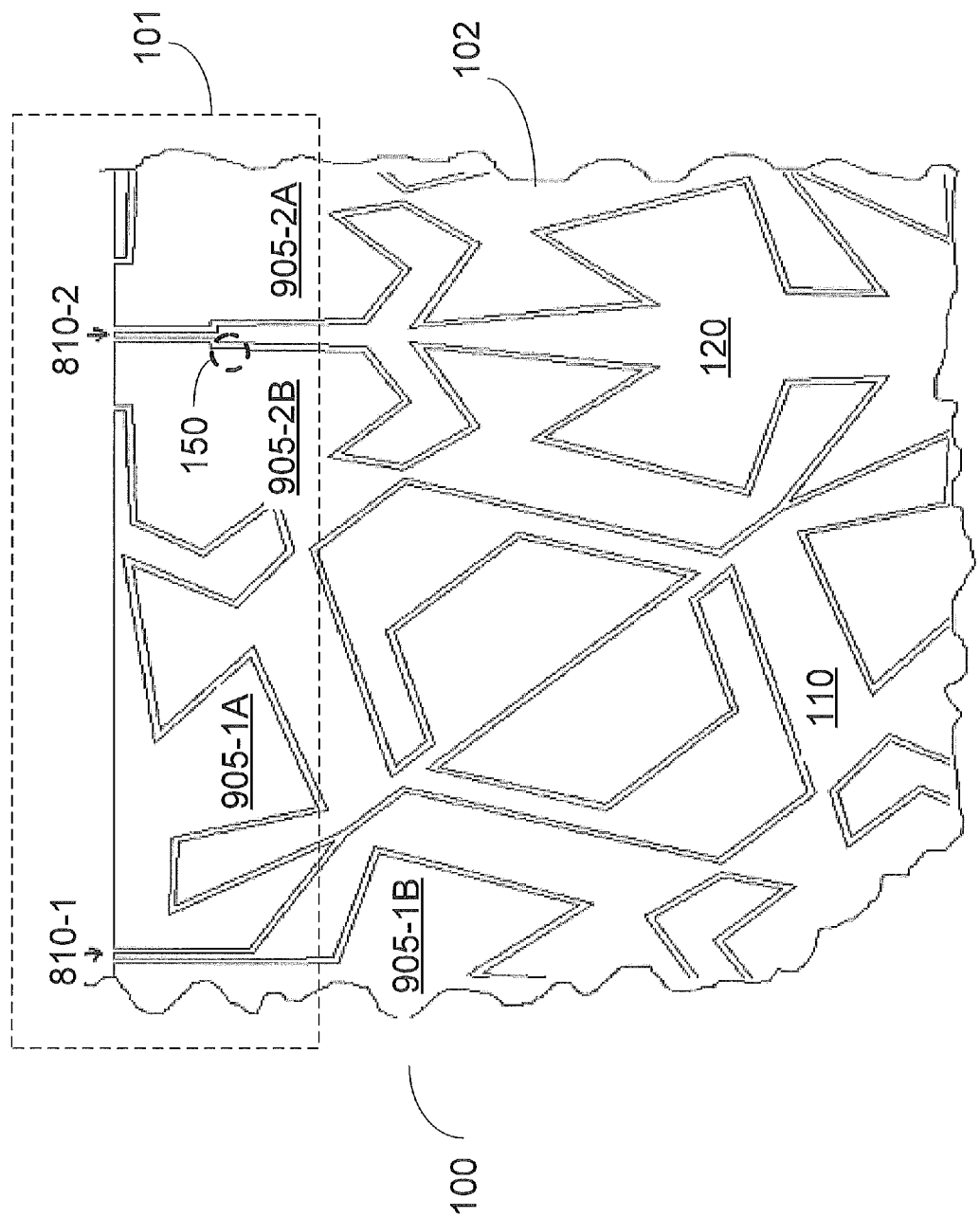
FIG. 9 shows a cutaway of a layout of conductive sensor elements for a single layer touch screen as in FIG. 8, including pass-through traces.

FIG. 9 shows a cutaway of layout 100 and edge portion 101 including sensor elements 110 and 120 with pass-through traces 810-1 and 810-2, according to some embodiments. Trace 810-1 may couple sensing element 110 to edge portion 101. And trace 810-2 may couple sensing element 120 to edge portion 101. Note that according to the embodiment illustrated in FIG. 9 trace 810-1 may pass through element 905-1. In order to avoid any coupling between elements 905-1 and 110, some embodiments may split element 905-1 in two portions: 905-1A and 905-1B. While portions 905-1A and 905-1B may seem disconnected in layout 100, they may be coupled electrically in edge portion 101 or in touch controller 20 (cf. FIG. 1). Likewise, trace 810-2 may pass through element 905-2. In order to avoid any coupling between elements 905-2 and 120, some embodiments may split element 905-2 in two portions: 905-2A and 905-2B. While portions 905-2A and 905-2B may seem disconnected in layout 100, they may be coupled electrically in edge portion 101 or in touch controller 20 (cf. FIG. 1).

While the presence of traces 810-1 and 810-2 alters the geometry of layout 100 in relation to elements 110 and 120, the changes introduced by traces 810 are limited. Embodiments consistent with layout 100 (FIG. 2) are such that even sensing elements such as 110 and 120 occupying a substantial portion of interior portion 102, may have portions near edge portion 101. Thus, the length needed for traces 810-1 and 810-2 to reach interior elements 110 and 120 may be reduced substantially.

Figure 10:
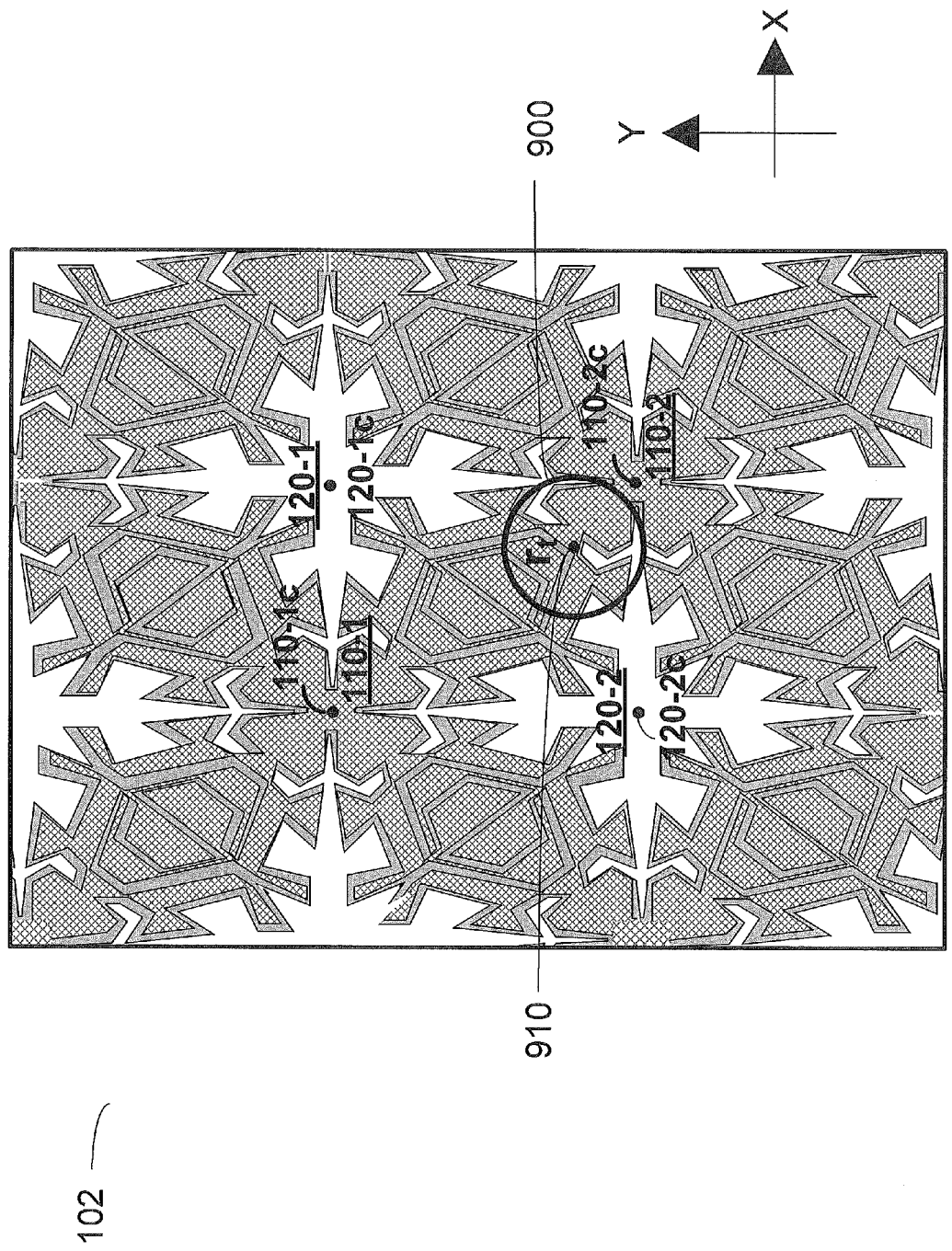
FIG. 10 shows a single touch on a layout of conductive sensor elements for a single layer touch screen as in FIG. 2, according to some embodiments.

FIG. 10 shows an example of a touch 900 on layout 100, according to some embodiments. Touch 900 according to FIG. 10 may be circular, having center 910 ($r_t$) with coordinates ($x_t$, $y_t$), and touch area $A_{touch}$. Some embodiments may have touch 900 with different geometries, and still be consistent with the calculation of a touch location according to FIG. 10. As illustrated in FIG. 10, touch 900 has an area $T_i$ overlapping sensing elements 110-1 ($T_1$), 110-2 ($T_2$), 120-1 ($T_3$) and 120-2 ($T_4$). A total touch overlap $A_T = T_1 + T_2 + T_3 + T_4$ may be obtained, so that an overlap proportion, $T_i/A_T$, may be designated for each touched element. Note that $A_T \leq A_{touch}$ because of the presence of gap 150, which may be insensitive to capacitive coupling by touch 900.

Using the centroid $r_i$, and overlap proportion ($T_i/A_T$) of each sensing element 110-1 ($T_1/A_T$, $r_1$), 110-2 ($T_2/A_T$, $r_2$), 120-1 ($T_3/A_T$, $r_3$), and 120-2 ($T_4/A_T$, $r_4$), location 910 ($r_t$) may be approximated as:

$$\vec{r}_t \approx \vec{R}_{loc} = \left(\frac{T_1}{A_T}\right)\cdot\vec{r}_1 + \left(\frac{T_2}{A_T}\right)\cdot\vec{r}_2 + \left(\frac{T_3}{A_T}\right)\cdot\vec{r}_3 + \left(\frac{T_4}{A_T}\right)\cdot\vec{r}_4 \quad (1)$$

According to embodiments consistent with FIGS. 1-10, the value of ($T_i/A_T$) may be measured by touch controller assuming that a change in capacitance of element 'i' is approximately proportional to the value of ($T_i/A_T$).

Table I shows a list of values for $T_1/A_1$ and $r_1$, $T_2/A_2$ and $r_2$, $T_3/A_3$ and $r_3$, and $T_4/A_4$ and $r_4$, consistent with FIG. 10. Table I also provides the value of $r_t$ and the value $R_{loc}$ calculated using Eq. (1).

TABLE I

|  | 110-1 | 110-2 | 120-1 | 120-2 |
|---|---|---|---|---|
| $T_i/A_i$ | 20.02% | 58.03% | 7.01% | 14.94% |
| ($r_{ix}$, $r_{iy}$) | (12.5, 25) | (25, 12.5) | (25, 25) | (12.5, 12.5) |
| ($r_{tx}$, $r_{ty}$) | (20.6, 16) |  |  |  |
| ($R_{localx}$, $R_{localy}$) | (20.63, 15.88) |  |  |  |

In general, touch 900 may overlap any number of 'k' elements. In such embodiments, a position $R_{local}$ may be calculated by the following expression:

$$\vec{r}_t \approx \vec{R}_{loc} = \sum_{i=1}^{k}\left(\frac{T_i}{A_T}\right)\cdot\vec{r}_i \quad (2)$$

Where $A_T$ is given by $$A_T = \sum_{i=1}^{k} T_i.$$

As can be seen in Table I, Eq. (2) renders an accurate 2D location for touch 900, with a location error, $e_{loc} = R_{loc} - r_t$. In general, the magnitude of location error ($|e_{loc}|$) is not zero: $|e_{loc}| \neq 0$. In some embodiments consistent with FIGS. 1-10 additional calculations or calibration steps may be included to reduce location error. The magnitude of location error $|e_{loc}|$ may vary according to the location of $r_t$ 910. For example, for $r_t$ 910 in edge portion 101, $e_{loc}$ may have a larger value compared to $r_t$ 910 at inner portion 102. Also, overlap proportion $T_i/A_T$ may be corrected to account for the position of overlap $T_1$ relative to the centroid $r_i$ of touch element 'i.'

Thus, in some embodiments overlap proportion $T_i/A_T$ for a given sensing element may be complemented with weight factor $f_i$ for vector $r_i$ in Eq. (2):

$$\vec{r}_t \approx \vec{R}_{loc\_new} = \sum_{i=1}^{k} f_i(\vec{R}_{loc\_old}) \cdot \left(\frac{T_i}{A_T}\right) \cdot \vec{r}_i \quad (3)$$

According to Eq. (3), factor $f_i(R_{loc\_old})$ depends on location 910 through a previously calculated $R_{loc\_old}$. That is, Eq. (3) is a recursive expression for $R_{loc}$, providing $R_{loc\_new}$ from the previously calculated value of $R_{loc\_old}$. Without prior knowledge of the value for $f_i$, $R_{loc\_old}$ may be obtained using Eq. (2). For example, $R_{loc\_old}$ may indicate that $r_t$ location 910 inside edge portion 101. $R_{loc\_old}$ may also indicate a distance between $r_t$ location 910 and $r_1$, and factor $f_1$ may compensate overlap $T_i/A_T$ in an inverse proportion to $|R_{loc\_old} - r_1|$. This is described in detail in relation to FIG. 11, below. The complementary factor $f_i$ associated to a sensing element 'i' for a touch location may be adjusted for aberrations caused by the sensing capability of each sensing element and their electronic coupling to the controller circuit.

Figure 11:
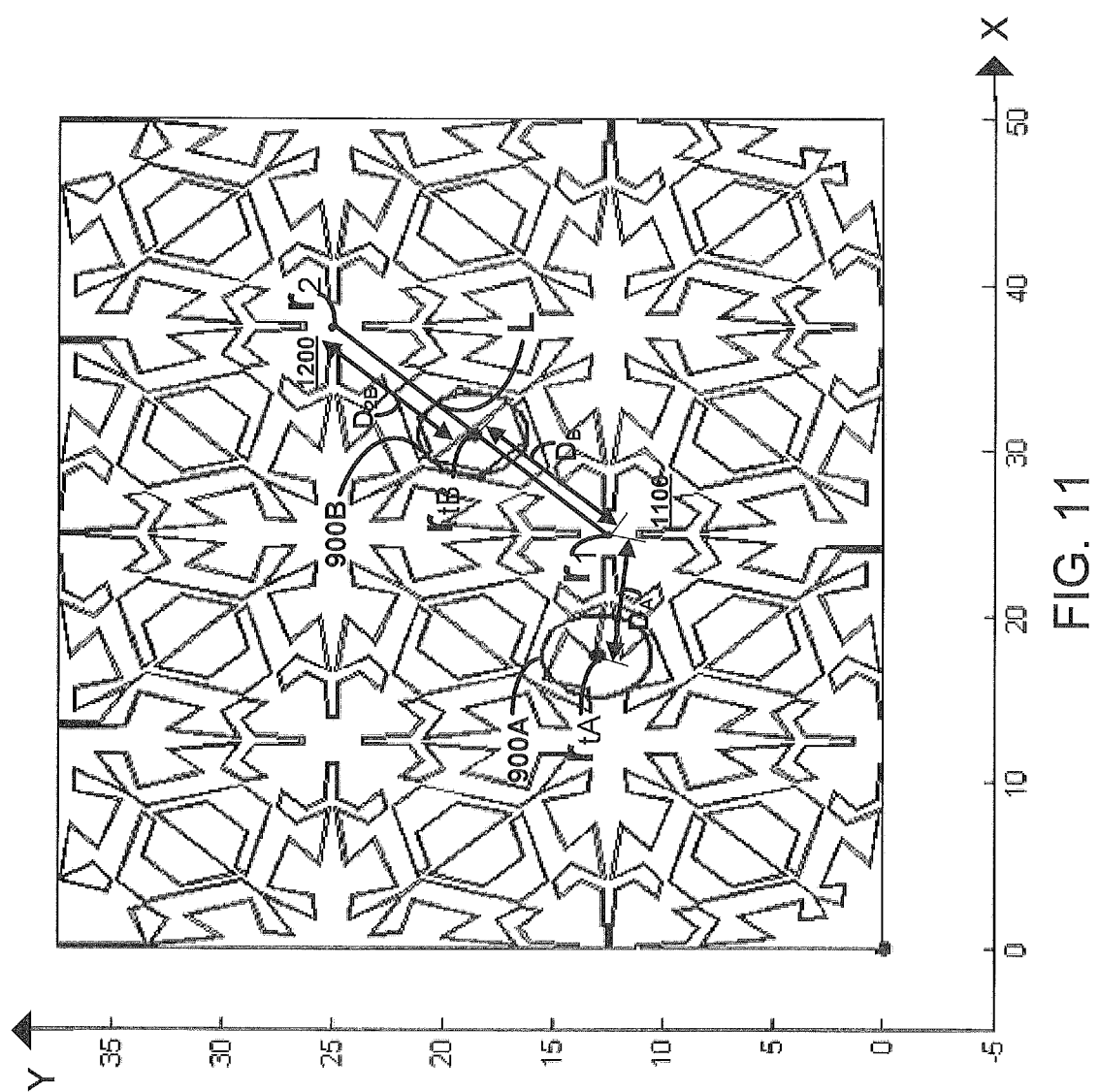
FIG. 11 shows two touches on a layout of conductive sensor elements for a single layer touch screen as in FIG. 2, according to some embodiments.

FIG. 11 shows touches 900A and 900B overlapping sensor elements 1100 and 1200, according to some embodiments of layout 100. Other elements that may overlap touches 900A and 900B are not labeled in FIG. 11, for simplicity. Touches 900A and 900B may have different overlap proportions of $T_{1100A}/A_T$ and $T_{1100B}/A_T$ for element 1100. For example, according to the embodiment depicted in FIG. 11, $T_{1100A}/A_T \approx 33.07\%$, and $T_{1100B}/A_T \approx 47.33\%$. This is a result of positions $R_{loc\_newA}$ and $R_{loc\_newB}$ having different contributions of $r_1$ according to different touch locations 910A ($r_{tA}$), 910B ($r_{tB}$). FIG. 11 clearly shows that the distance $D_A$ between touch 900A and centroid $r_1$ is smaller than distance $D_B$ between touch 900B and centroid $r_1$, even though $T_{1100A}/A_T$ is smaller than $T_{1100B}/A_T$. This example shows that the contribution of $T_{1100A}/A_T$ may not be monotonically increasing, even for a touch closer to $r_1$.

Further shown in FIG. 11, location 910B lies along straight segment L joining centroids $r_1$ and $r_2$ for elements 1100 and 1200, respectively. In FIG. 11, $T_{1100B}/A_T \approx 47.33\%$, and $T_{1200B}/A_T \approx 52.67\%$. Consequently, overlap factors between elements 1100, 1200 and touch 900B obey the following relation:

$$(T_{1200B}/A_T) > (T_{1100B}/A_T)$$

It is also clear form FIG. 11 that $r_{tB}$ is closer to $r_1$ than to $r_2$, along line L ($D_{2B} > D_B$). Due to factors such as parasitic capacitance, in some embodiments the capacitance measured for $T_{1200B}/A_T$ may be lower than the capacitance measured for $T_{1100B}/A_T$. In such case, the contribution of $r_1$ to $R_{loc\_oldB}$ may be lower than the accurate value and the contribution of $r_2$ to $R_{loc\_oldB}$ may be greater than the accurate value. Thus, the calculated touch may be closer to $r_2$ than the true touch. Thus, the calculation for $R_{loc\_newB}$ may use a complementary weight factor $f_1(R_{loc\_oldB})$ for $T_{1200}/A_T$ to enhance the contribution of $r_1$. Likewise, $R_{loc\_newB}$ may use a complementary weight factor $f_2(R_{loc\_oldB})$ for $T_{1100}/A_T$ to reduce the contribution for $r_2$.

The precise value for factors $f_i$ may be dependent on the size of $A_{touch}$. Embodiments consistent with the detailed description of FIGS. 1 to 11 above may support finger or stylus touch sizes from approximately 2 mm to approximately 18 mm in diameter. Other diameters may be used, according to the requirements of the application considered.

Thus, in embodiments consistent with FIG. 11, a first touch location $R_{loc\_old}$ may be obtained using Eq. (2). The value of $R_{loc\_old}$ may be used by touch controller 20 to obtain complementary factor $f_i(R_{loc\_old})$. In some embodiments, complementary factor $f_i(R_{loc\_old})$ may be an analytic expression using the coordinate values of point $R_{loc\_old}$. Some embodiments may use a lookup table of values $f_i$ stored in memory 40, according to a discrete set of positions. Thus, a value $f_i$ may be selected corresponding to a position which is close to $R_{loc\_old}$. With complementary factor $f_i$, processor 30 in touch controller 20 may use Eq. (3) to find a corrected location $R_{loc\_new}$. The process may be iterated more than once, and as many times as necessary in order to obtain a magnitude of location error $|e_{loc}|$ that is no greater than a pre-selected value.

In some embodiments, the number of iterations taken by touch controller 20 may be determined by calibration of touch sensor 10 for a given size of layout 100, and $A_{touch}$. A calibration of touch sensor 10 may include the use of a "touch" device having area $A_{touch}$ and attached to a precise location mechanism, such as a robot. The touch device is scanned along pre-established trajectories on layout 100. For example, the trajectories may include straight lines parallel along the 'X' and 'Y' axes of layout 100 (cf. FIG. 2). Location measurements from touch sensor 10, $R_{loc}$, are collected at a number of points along the calibration trajectories, and compared to the precise location positions measured by the robot. Thus, a map of $|e_{loc}|$ values may be provided for each of the calibration points selected. Further, each map may be compared to other calibration runs, in order to select the configuration that provides the lowest location errors. For example, the number of iterations used with Eq. (3) may be incremented from one calibration run to the next, until a sufficiently low value of location error is obtained for every calibration point.

Some embodiments may provide a map of values for complementary factors $f_i$ for each pre-selected calibration point. Thus, a value for $f_1$ may be stored in memory 40 for each calibration point and for each sensing element Once $R_{loc\_old}$ is obtained for an arbitrary touch 900, memory 40 selects the complementary factor $f_i(R_{loc\_old})$ by looking up in the stored table of values for the calibration position closest to $R_{loc\_old}$.

Figure 12:
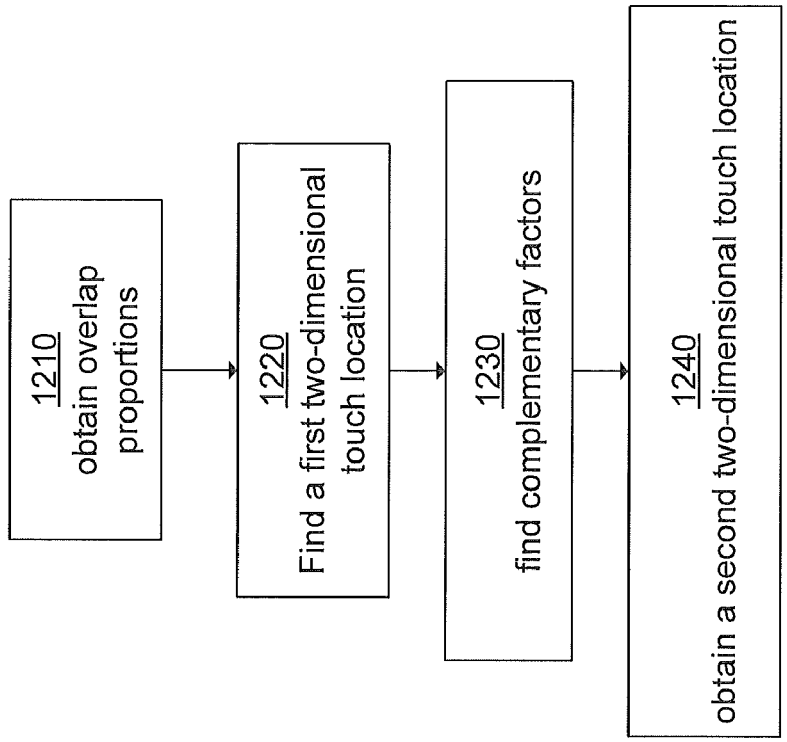
FIG. 12 shows a flow chart for a method of using a controller circuit to find a two-dimensional location on a touch screen according to some embodiments.

FIG. 12 shows a flow chart for a method 1200 of using controller 20 to find a two-dimensional location 910 on a touch screen as described in FIGS. 10 and 11. In step 1210, overlap proportions between touch 900 and sensing elements in a touch screen are obtained. For example, sensing elements may be such as elements 110 and 120 in layout 100 (cf. FIG. 10). The overlap proportion of touch 900 may be obtained by coupling a signal from each sensing element 110 and 120 in layout 100 to controller 20 using connector 50 (cf. FIG. 1). In some embodiments, a capacitance coupling circuit in controller 20 may be used to obtain an overlap proportion for touch 900 with each of sensing elements 110 and 120. In step 1220 a first two-dimensional location is obtained ($R_{loc\_old}$) by controller 20, using the overlap proportions. In some embodiments, step 1220 may be performed by arithmetic operations such as described in Eq. (2).

Using the first two-dimensional location ($R_{loc\_old}$) controller 20 may perform step 1230 in which complementary factors $f_i(R_{loc\_old})$ are obtained. According to embodiments consistent with FIGS. 10 and 11, a complementary factor $f_i$ may be obtained for each sensing element 110 and 120 in layout 100. Some embodiments may obtain factors $f_i$ for elements overlapping touch 900. For example, in some embodiments the complementary factors $f_i$ may be obtained only for sensing elements having an overlap proportion different from zero. Moreover, some embodiments may obtain complementary factor $f_i$ according to a first two-dimensional location $R_{loc\_old}$, and also according to element 'i'. For example, for elements 'i' located inside edge portion 101 of layout 100 the complementary factor $f_i$ may be different than for elements in portion 102. This may provide error correction for a touch 900 near the edge of layout 100.

Once complementary factors $f_i$ are obtained in step 1230, controller 20 may perform step 1240 in which a second two-dimensional touch location ($R_{loc\_new}$) is obtained. In some embodiments, $R_{loc\_new}$ may be obtained by using factors $f_i$ from step 1230 and overlap proportions from step 1210 in Eq. (3). Complementary factor $f_i$ may be greater than one (1), equal to one (1), smaller than one (1), or zero, according to embodiments consistent with FIG. 11.

In some embodiments consistent with FIGS. 10, 11 and 12, steps 1220 through 1240 in method 1200 may be repeated a predetermined number of times, 'N.' The value of 'N' may be obtained from previous calibration processes as described above. Furthermore, 'N' may be dependent on the value of $R_{loc\_old}$. For example, if $R_{loc\_old}$ is within edge portion 101, then 'N' may be larger than one (1), such as two (2), three (3), or even larger.

Figure 13:
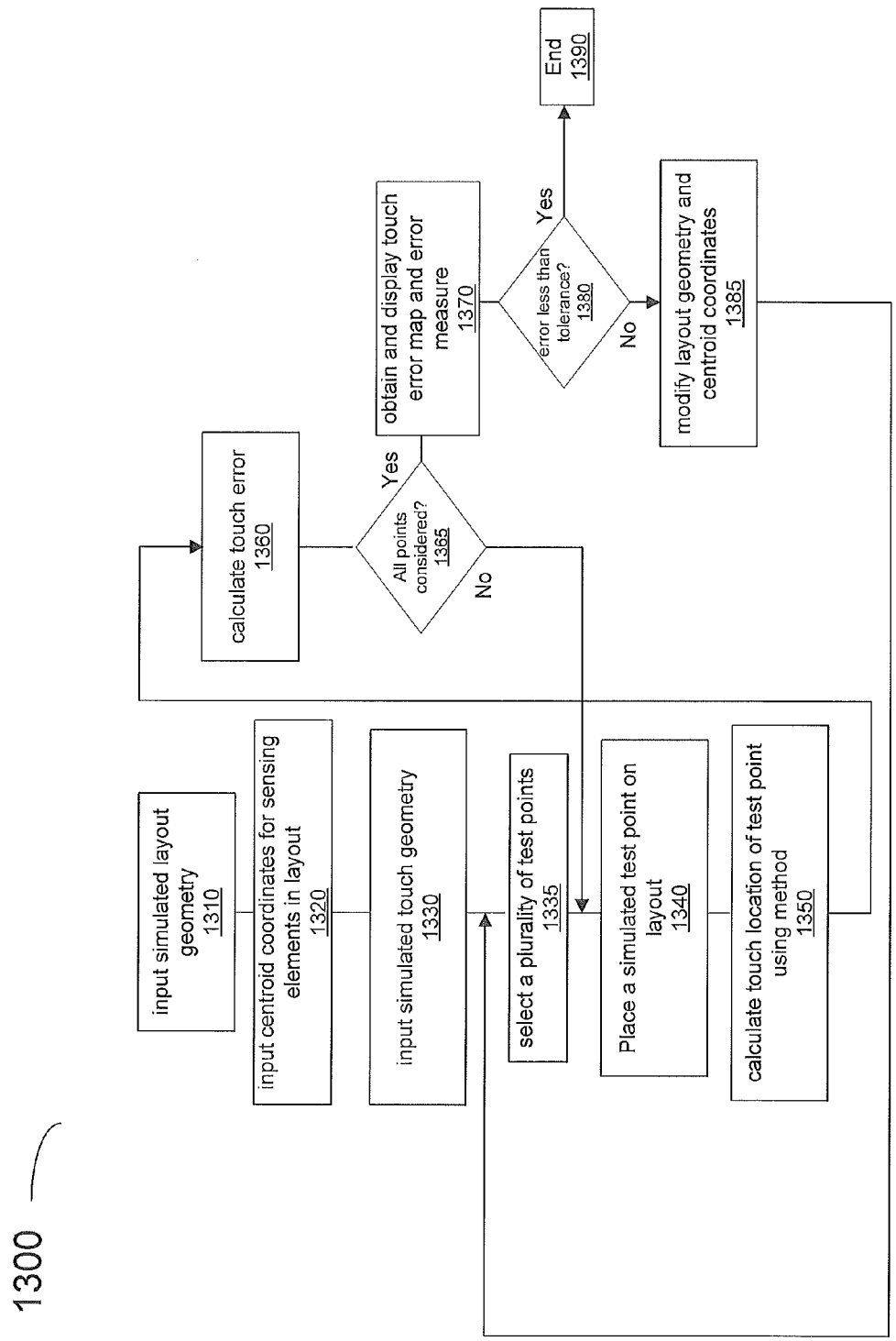
FIG. 13 shows a flow chart for a method of testing the performance of a proportional area weighted sensor for finding locations on a touch screen according to some embodiments.

FIG. 13 shows a flow chart for method 1300 of testing the performance of a touch screen device 10 for finding locations on touch screen layout according to some embodiments. The steps illustrated in FIG. 13 may be performed using a processor capable of executing instructions stored on a computer readable medium for performing the illustrated method. Consistent with some embodiments, the processor may be included in an electronic appliance such as a desktop, laptop, handheld or other computer device. The electronic appliance may include a display device for displaying visual results, and an input device for inputting commands and instructions. The computer readable medium may be a memory device attached to the electronic appliance or otherwise coupled to the processor in some embodiments. Some embodiments may provide the instructions to perform the steps in method 1300 in a portable memory device such as a non-volatile memory device. Consistent with further embodiments, the electronic appliance may include one or more discrete modules configured for performing one or more of the steps illustrated in FIG. 13.

Figure 14:
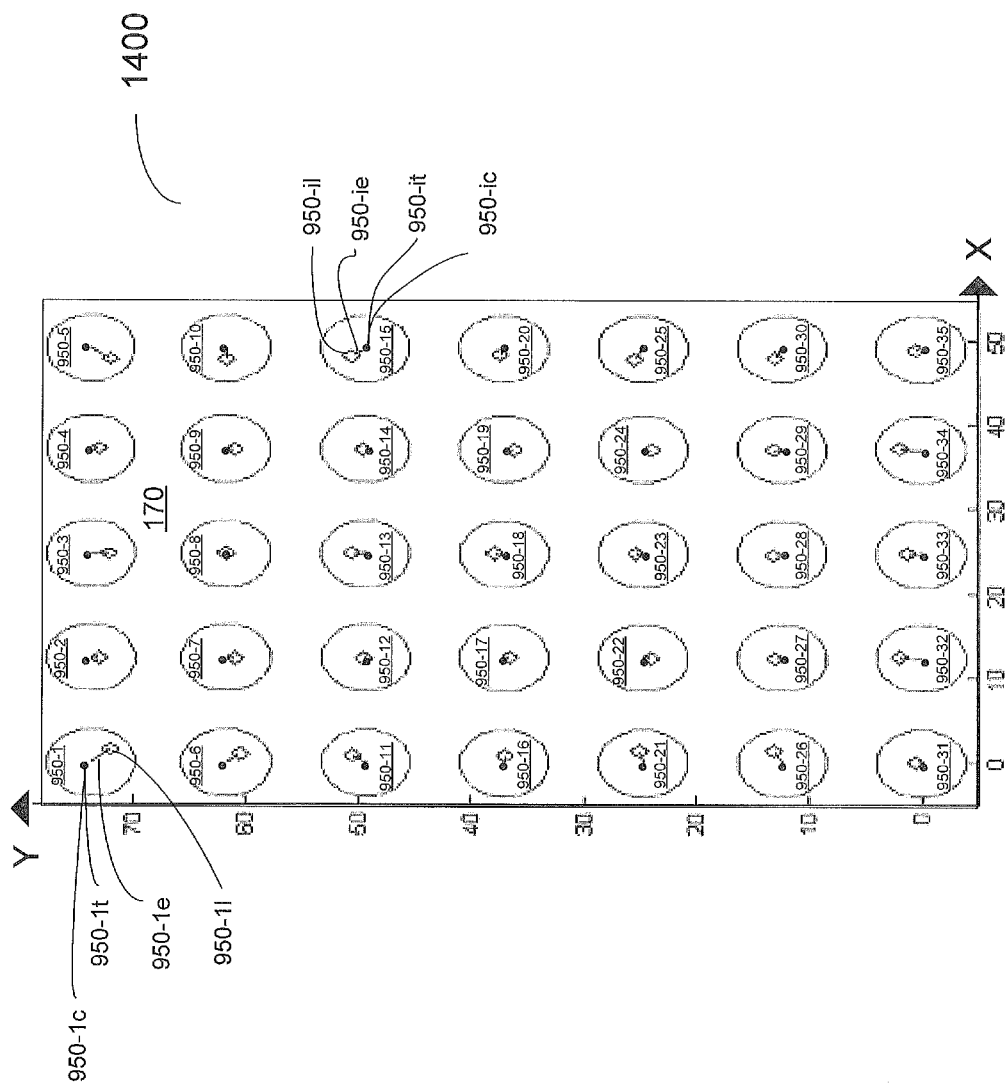
FIG. 14 shows an error map resulting from performing the method illustrated in FIG. 13, according to some embodiments.

The method illustrated in FIG. 13 is discussed in conjunction with the simulation layout 170 shown in FIG. 14. In step 1310, a geometry for a simulation layout 170 is input to the computer. The geometry may include the shapes of elements 110-115, 120-125, and 105-1 to 105-18 as illustrated in FIG. 2 in a two-dimensional frame of reference. In step 1320, the coordinates for the centroids of sensing elements in simulation layout 170 according to the frame of reference are also input to the computer. In step 1330, the geometry of a simulation 950 for a touch, such as touch 900 shown in FIG. 9, is input to the computer. Some embodiments may use a polygonal shape circumscribed by a circle of a pre-selected diameter as simulation touch 950. The pre-selected diameter may be 2 mm, 12 mm, 18 mm, or any value in between. Some embodiments may include touch sizes having a smaller diameter than 2 mm, or a larger diameter than 18 mm.

In step 1335, a plurality of test points 950$t$ is selected on layout 170. In some embodiments, the test points may form a one-dimensional trajectory on the plane of simulation layout 170. In some embodiments, the test points may form a grid of evenly spaced points on simulation layout 170. For example, a grid of test points may be a square grid oriented in parallel with the frame of reference. Test points may have a pitch along the 'X' direction and a pitch along the 'Y' direction. Some embodiments may include several one-dimensional trajectories of test points on layout 170.

In step 1340, simulation touch 950 is placed over simulation layout 170 on a test point 950$t$. Simulation touches 950 are placed so that their geometric center 950$c$ lies on top of test point 950$t$ selected in step 1335. In step 1350, a two-dimensional touch location 9501 is calculated for simulated point 950 centered on a test point 950$t$. Point 950$t$ may be obtained according to the steps of method 1200 described in relation to FIG. 12. In step 1360, a touch error 950$e$ is obtained from the difference between the positions of points 950. Touch error 950$e$ may be a two-dimensional vector as described above in relation to Table I: $e_{loc}=R_{loc}-r_t$, where $R_{loc}$ is the calculated position 950$l$, and $r_t$ is the test point position 950$t$. Note that according to embodiments of method 1300 the location of test point 950$t$ is the same or substantially close to the location of the simulated point center 950$c$. In step 1365 it is verified whether or not all test points have been considered for the calculation of touch error 950$e$. If this is not the case, then the method is repeated from step 1340, until all test points have been considered in the calculations.

In step 1370, the touch errors for a plurality of test points are displayed for analysis. In some embodiments, touch errors 950$e$ may be included in a touch error map, for display. In the analysis, a pre-selected tolerance value τ may be compared with an error measure 1399 in step 1380. For example, an average value of the magnitude $|e_{loc}|$ of vectors 950$e$ in the touch error map may be used as measure 1399. In some embodiments, a maximum value of $|e_{loc}|$ for vectors 950$e$ in the touch error map may be used as error measure 1399. If measure 1399 is less than the pre-selected tolerance value, then the method is terminated in step 1390.

If error measure 1399 obtained in step 1370 is larger than τ then simulated layout 170 is modified in step 1385, and the method is repeated from step 1335. In some embodiments, step 1385 may include the adjustment of the centroid coordinates for sensing elements in simulated layout 170. Some embodiments may perform step 1385 including modifications to the geometry of simulated layout 170 and modifying the centroid coordinates for sensing elements as well. A modification of the geometry of simulated layout 170 may include the step of changing the shapes of at least one of the sensing elements in layout 100. Note that in some embodiments of layout 100 consistent with FIG. 2, modifying the shape of one of the sensing elements may include modifying the shape of at least one adjacent sensing element. This may allow layout 100 to keep a constant gap 150 between adjacent elements.

FIG. 14 shows error map 1400 resulting from performing the method illustrated in FIG. 13, according to some embodiments. Simulation touches 950-1 to 950-35 may be placed with centers 950-1$c$ to 950-35$c$ forming a rectangular grid parallel to the 'X-Y' coordinates. Each point 950$t$ on the grid may be separated from its nearest neighbor by a finite distance. Note that in embodiments consistent with FIG. 14, touch centers 950-$ic$ are equal to test point 950-$it$. Also, in FIG. 14 center point 950$c$, test point 950$t$, calculated point 9501 and error vector 950$e$ are labeled only for point 950-1, for clarity. Equivalent labels are used for all other touches 950-2 to 950-35 shown in FIG. 14. Error map 1400 may be obtained for a simulated layout 170 consistent with layout 100 shown in FIG. 2. Error vectors 950$e$ are plotted so that each two-dimensional error vector 950$e$ is anchored on test point 950$t$ (or 950$c$). The horizontal scale and the vertical scale in FIG. 14 may have any units according to the specific dimensions of layout 170. For example, in embodiments consistent with FIG. 14 the units in the horizontal and vertical dimensions may be millimeters (mm).

It is seen that for touch points located closer to the edge of simulated layout 170, error values may be larger in amplitude than for touch points located closer to the interior portion of layout 170. For example, error vectors 950-1e to 950-5e, 950-31e to 950-35e, 9506e, 950-11e, 950-16e, 950-21e, 950-26e, 950-10e, 950-15e, 950-20e, 950-25e, and 05-30e are generally larger than error vectors for test points inside layout 170. This indicates that for touches close to edge portion 101 in layout 100 the location error may be larger than for touches in interior portion 102. This type of error may be corrected by modifying the shapes of sensing elements 105-1 to 105-18 in layout 100. Some embodiments of the method disclosed herein consistent with the method described in relation to FIG. 13 may include adjusting the positions of centroids 105-1c to 105-18c (cf. FIG. 2) in order to reduce the value of error measure 1399 below τ.

Figure 15:
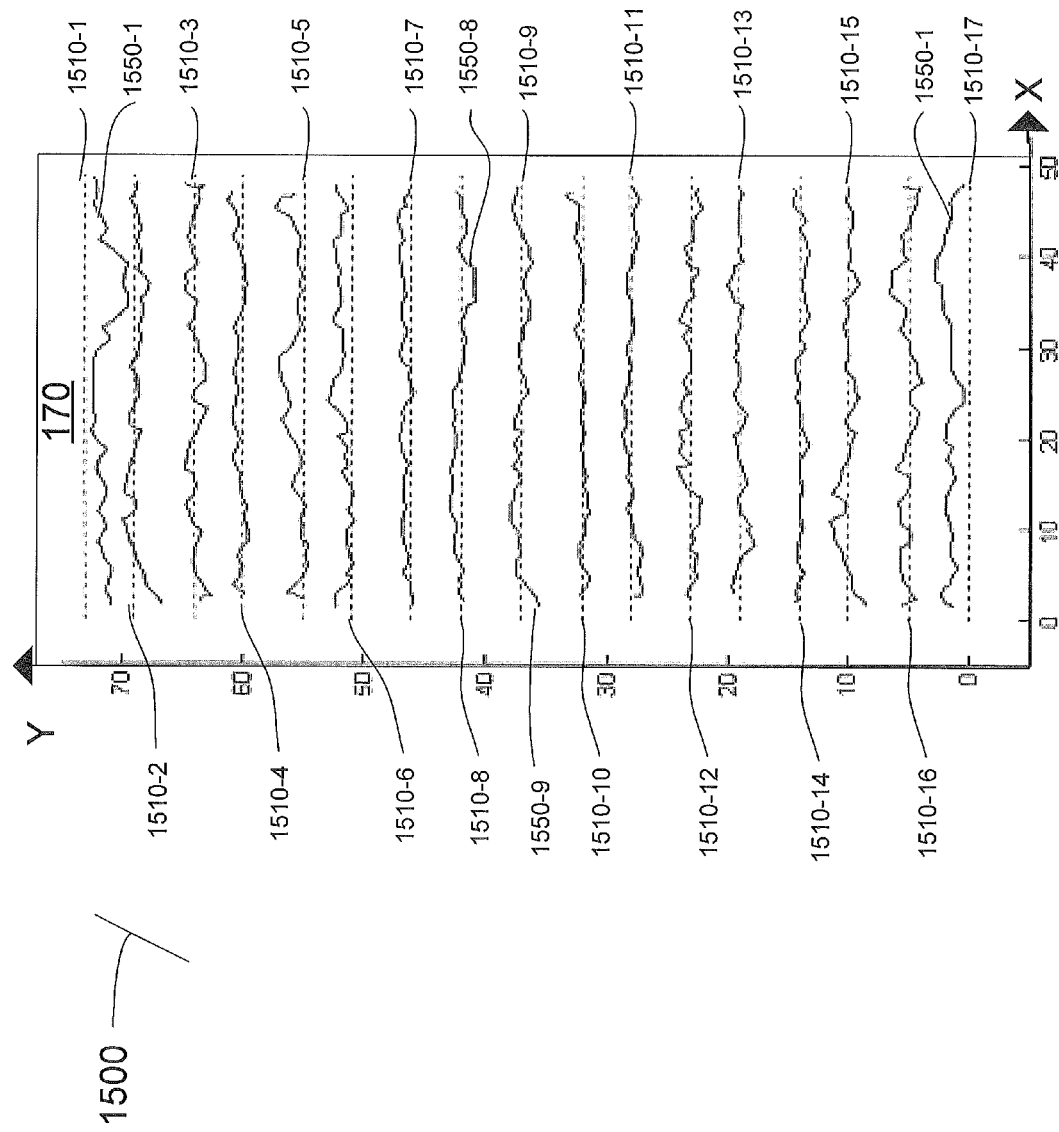
FIG. 15 shows an error map resulting from performing the method illustrated in FIG. 13, according to some embodiments.

FIG. 15 shows error map 1500 resulting from performing the method illustrated in FIG. 13, according to some embodiments. In FIG. 15, test points 950t are selected to form one-dimensional 'test' trajectories 1510-1 to 1510-17. Trajectories 1510-1 to 1510-17 may be horizontal, parallel to the X-axis of simulated layout 170. The positions of located points 9501 according to the method described in FIG. 13 are shown also as one-dimensional 'calculated' trajectories 1550-1 to 1550-17. Error map 1500 may be obtained for a simulated layout 170 consistent with layout 100 shown in FIG. 2. The horizontal scale and the vertical scale in FIG. 15 may have any units according to the specific dimensions of layout 170. For example, in embodiments consistent with FIG. 15 the units in the horizontal and vertical dimensions may be millimeters (mm).

According to embodiments consistent with FIG. 15, it is seen that the amplitude of error 950e is generally larger for trajectories 1510-1 and 1510-17, closer to the edges of simulated layout 170. The amplitude of error 950e is lower for trajectories such as 1510-8 to 1510-11, closer to the interior portion of simulated layout 170. This is consistent with embodiments such as described in relation to FIG. 14 above. Furthermore, consistent with FIG. 14, error 950e is such that curves 1550-1 and 1550-17 have most points on the interior side of test curves 1510-1 and 1510-17, respectively. That is, calculated curve 1550-1 lies under test curve 1510-1, and calculated curve 1550-17 lies above calculated curve 1510-17. By comparison, calculated curves closer to the interior portion of layout 170 have points on either side of test curve. For example, calculated curve 1550-8 has points above and below test curve 1510-8. The same may be said regarding calculated curve 1550-9 and test curve 1510-9. Thus, in some embodiments there is a tendency for error vectors to be larger in touches near edge portion 101 of layout 100, compared to touches in interior portion 102. Furthermore, in some embodiments the two-dimensional location tends to be shifted towards interior portion 102 for touches near or on edge portion 101.

Figure 16:
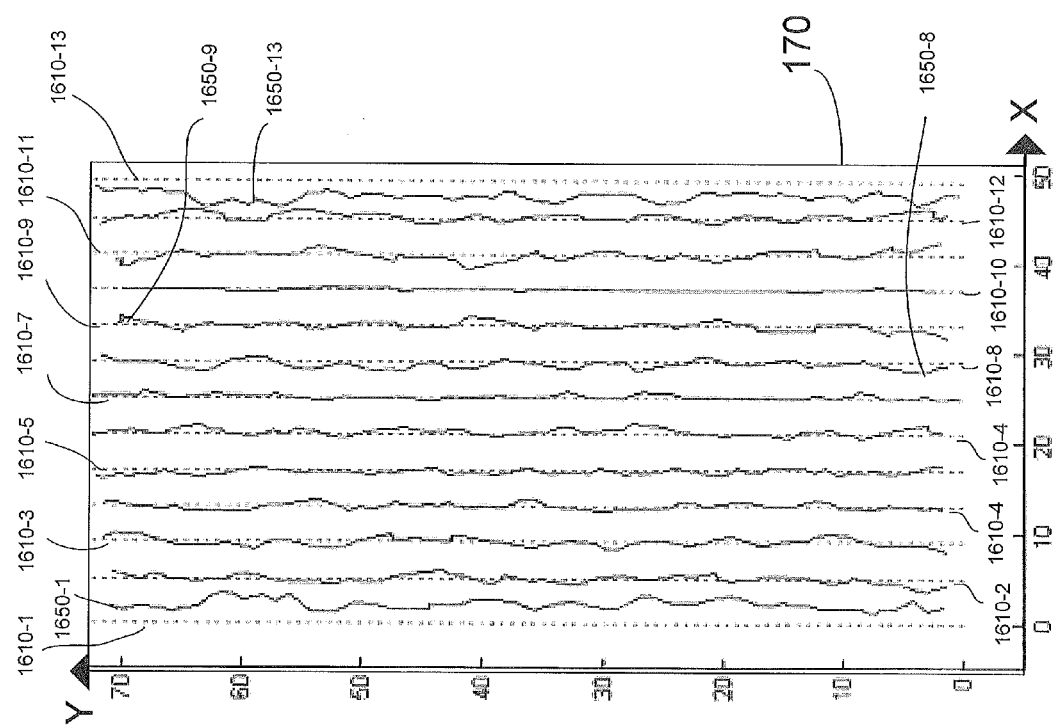
FIG. 16 shows an error map resulting from performing the method illustrated in FIG. 13, according to some embodiments.

FIG. 16 shows error map 1600 resulting from performing the method illustrated in FIG. 13, according to some embodiments. In FIG. 16, test points 950t are selected to form one-dimensional 'test' trajectories 1610-1 to 1610-13. Trajectories 1610-1 to 1610-13 may be vertical, parallel to the Y-axis of simulated layout 170. The positions of located points 9501 according to the method described in FIG. 13 are shown also as one-dimensional 'calculated' trajectories 1650-1 to 1650-13. Error map 1600 may be obtained for a simulated layout 170 consistent with layout 100 shown in FIG. 2. The horizontal scale and the vertical scale in FIG. 16 may have any units according to the specific dimensions of layout 170. For example, in embodiments consistent with FIG. 16 the units in the horizontal and vertical dimensions may be millimeters (mm).

According to embodiments consistent with FIG. 16, it is seen that the amplitude of error 950e is generally larger for trajectories 1610-1 and 1610-13, closer to the edges of simulated layout 170. The amplitude of error 950e is lower for trajectories such as 1610-6 to 1610-10, closer to the interior portion of simulated layout 170. This is consistent with embodiments such as described in relation to FIGS. 14 and 15 above. Furthermore, consistent with FIG. 16, error 950e is such that curves 1650-1 and 1650-13 have most points on the interior side of test curves 1610-1 and 1610-13, respectively. That is, calculated curve 1650-1 lies to the right of test curve 1610-1, and calculated curve 1650-13 lies to the left of test curve 1610-13. By comparison, calculated curves closer to the interior portion of layout 170 have points on either side of test curve. For example, calculated curve 1650-8 has points to the left and right of test curve 1610-8. The same may be said regarding calculated curve 1650-9 and test curve 1610-9. Thus, in some embodiments there is a tendency for error vectors to be larger in touches near edge portion 101 of layout 100, compared to touches in interior portion 102. Furthermore, in some embodiments the two-dimensional location tends to be shifted towards interior portion 102 for touches near or on edge portion 101.

Figure 17:
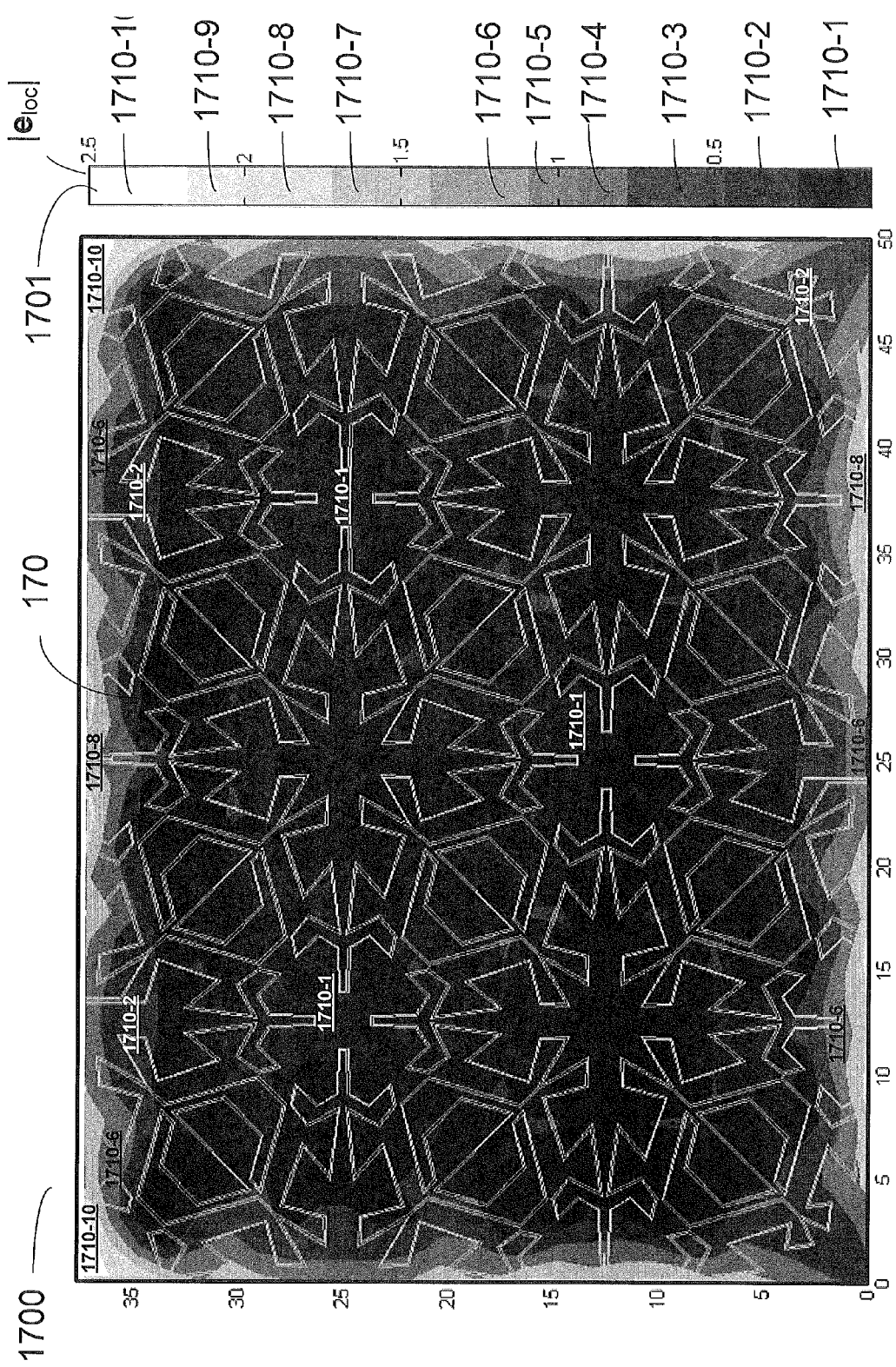
FIG. 17 shows an error map resulting from performing the method illustrated in FIG. 13, according to some embodiments.

FIG. 17 shows error map 1700 resulting from performing method 1300 (cf. FIG. 13), according to some embodiments. Error map 1700 may be obtained for simulated layout 170 consistent with layout 100 shown in FIG. 2. The horizontal scale, the vertical scale, and scale 1701 in FIG. 17 may have any units according to the specific dimensions of layout 170. For example, in embodiments consistent with FIG. 17 the units in the horizontal and vertical dimensions and in scale 1701 may be millimeters (mm). In FIG. 17, test points 950t (not shown) may be selected to form a grid of points within simulated layout 170, such as in FIG. 14. According to embodiments consistent with FIG. 17, a grid of 27 rows and 35 columns (=945 points total) of points 950t may be selected. The points may be uniformly distributed across simulated layout 170 to a manufacturing tolerance, keeping the aspect ratio of layout 170.

Error vectors 950e are found for each test point 950t as described in detail in relation to FIG. 14. For each vector 950e an amplitude $|e_{loc}|$ may be found according to step 1360 in method 1300. Error map 1700 is obtained from a contour plot of the $|e_{loc}|$ values thus obtained. Scale 1701 may be associated to map 1700. Scale 1701 associates graded shades of gray 1710-1 to 1710-10 to a selected portion of values of $|e_{loc}|$ between 0 and the maximum error found. For example, in embodiments consistent with FIG. 17 a black shade 1710-1 may be associated to $|e_{loc}|$ values between zero and about 0.2 mm. A lighter shade 1710-3 may be associated to $|e_{loc}|$ values between about 0.4 mm and about 0.75 mm. A lighter shade 1710-6 may be associated to $|e_{loc}|$ values between about 1.2 mm and about 1.4 mm. A lighter shade 1710-9 may be associated to $|e_{loc}|$ values between about 2 mm and about 2.2 mm. A white shade 1710-10 may be associated to $|e_{loc}|$ values between about 2.2 mm and a maximum value of $|e_{loc}|$.

Thus, portions of simulated layout 170 including test points 950t for which $|e_{loc}|$ may be within the ranges selected for shades 1710-1 to 1710-10, are darkened with the corresponding shade. Some embodiments of error map 1700 may include a color code instead of a gray scale. Further, some embodiments of error map 1700 may depict only the borders between the shaded portions in FIG. 17. In such cases, the areas limited by a border line may include test points 950*t* for which the values of |e*loc*| lay within the selected range.

Figure 18:
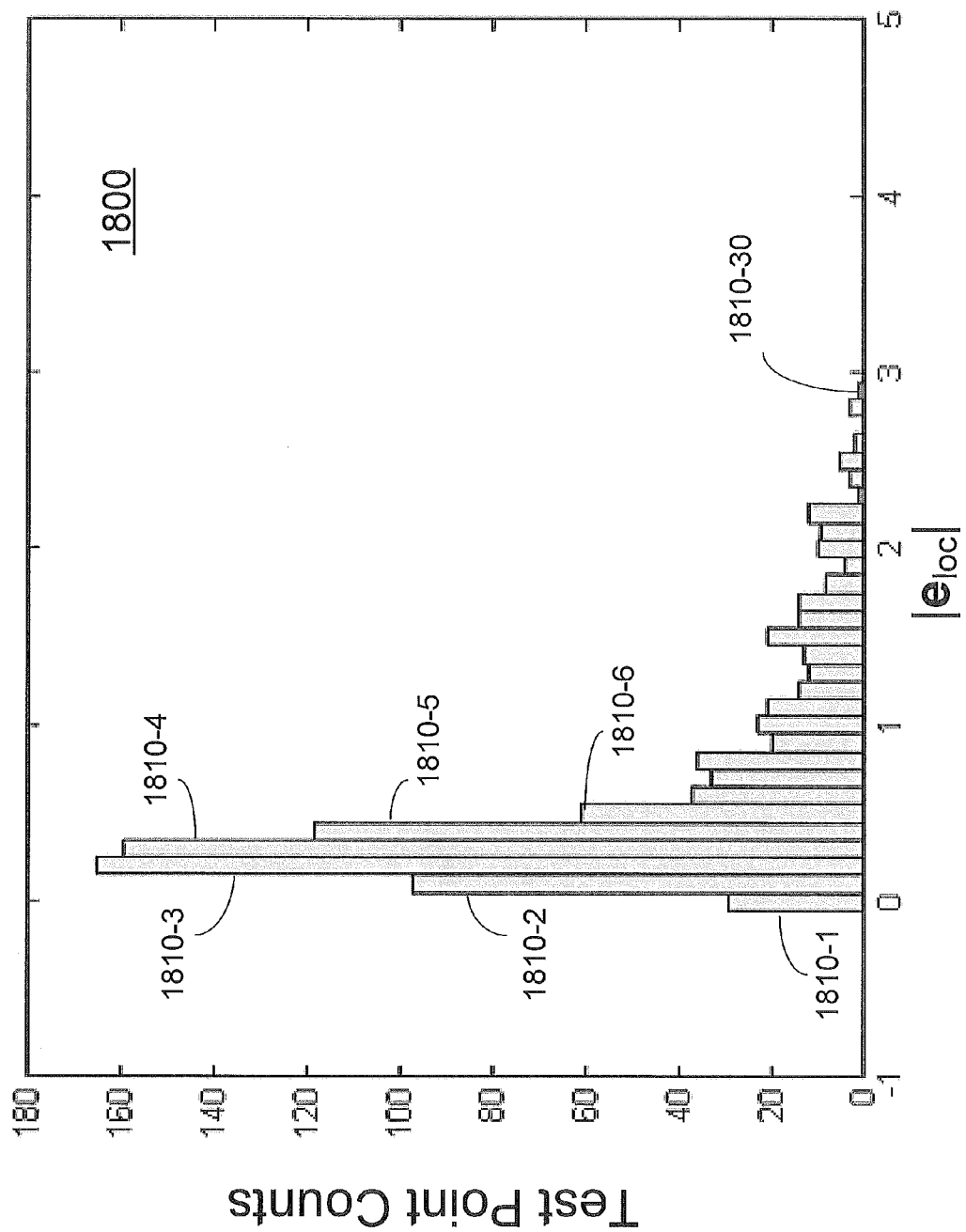
FIG. 18 shows a histogram of an error map as in FIG. 17 from performing the method illustrated in FIG. 13, according to some embodiments.

FIG. 18 shows histogram 1800 of error map 1700 (cf. FIG. 17) after performing method 1300 (cf. FIG. 13), according to some embodiments. Histogram 1800 has values |e*loc*| in the abscissa, and test point counts in the ordinates. To obtain histogram 1800, an interval of values of |e*loc*| from zero to a maximum obtained value is partitioned in a number of sequential intervals or 'bins' 1810. The number of bins 1810 selected may vary depending on the degree of precision that is sought with method 1300. For example, in embodiments consistent with FIG. 18 a total of 30 bins 1810-1 to 1810-30 may be selected. Furthermore, FIG. 18 illustrates an embodiment where bins 1810-*i* may all have the same or similar size in the abscissa, within a computation tolerance. Some embodiments of histogram 1800 may include bins 1810-*i* having different sizes. Bins 1810 in histogram 1800 may correspond to the selection of ranges for shaded areas 1710-*i* in error map 1700 (cf. FIG. 17). Some embodiments may have partitions of the |e*loc*| interval including bins 1810 not equal to the selection of ranges for shaded areas 1710-*i* in error map 1700. For example, some embodiments may have a more refined partition of the |e*loc*| interval for bins 1810 than the ranges selected for shaded areas 1710-*i*. Thus, bins 1810-*i* may be smaller than the ranges in shaded areas 1710-*i*. A count number is associated to each bin 1810-*i* according to the number of test points 950*t* having a magnitude |e*loc*| of error vector 950*e* within bin 1810-*i*.

As illustrated in FIG. 18, the maximum error found is less than 3 mm in bin 1810-30. From histogram 1800, an average error for the 945 points 950*t* of FIG. 17 is found to be less than 0.6 mm. A standard deviation may also be obtained from histogram 1800, with a value of about 0.57 mm. Histogram 1800 may provide information used in step 1370 of method 1300 to obtain error measure 1399. For example, an error measure 1399 may be the maximum value obtained for |e*loc*|. Some embodiments may use measure 1399 as the average obtained from histogram 1800. Further, some embodiments may use the standard deviation in histogram 1800 as error measure 1399. Other combinations of the parameters in histogram 1800 may be used for error measure 1399. For example, higher order momentum components of the distribution formed by histogram 1800 may be used for measure 1399. For example, the variance about the mean of the distribution may be included in error measure 1399.

According to embodiments consistent with method 1300 (cf. FIG. 13) and error maps 1400-1700 for each iteration of steps 1335 to 1380 a different set of test points 950*t* may be chosen. For example, in an initial iteration a lower number of test points 950*t* may be selected. This may be a sparse grid of points to produce error maps as 1400 (cf. FIG. 14) or 1700 (cf. FIG. 17). Or a plurality of linear trajectories separated by wide gaps, as in error maps 1500 (cf. FIG. 15) and 1600 (cf. FIG. 16). In further iteration stages, the number of test points 950*t* may be increased gradually. For example, if error measure 1399 is found below threshold τ in step 1380, some embodiments may repeat steps 1335 to 1380 with a new set of test points 950*t* before ending the method in step 1390. The new set of test points 950*t* may be a denser grid of points to produce error maps 1400 (cf. FIG. 14) and 1700 (cf. FIG. 17) with higher resolution. In embodiments consistent with error maps 1500 (cf. FIG. 15) and 1600 (cf. FIG. 16), a new set of test points 950*t* may include a plurality of trajectories more closely spaced relative to each other.

Some embodiments consistent with the description provided in FIGS. 1-18 may correspond to flat touch screens. In some embodiments consistent with the description provided for FIGS. 1-16 a two-dimensional touch sensor layout may be placed on a portion of the surface of a three-dimensional (3-D) object. For example such a 3-D object may include a cylindrical shape such as a handlebar used in a bicycle or a treadmill machine. In some embodiments, a 3-D object may have a round shape, or a spherical shape, such as a ball, a helmet, or a visor screen.

Embodiments described herein are exemplary only. One skilled in the art may recognize various alternative embodiments from those specifically disclosed. Those alternative embodiments are also intended to be within the scope of this disclosure. As such, the embodiments are limited only by the following claims.

What is claimed is:

1. An electronic appliance including a processor, a computer-readable medium, an input device, and a display device, the computer-readable medium including instructions for execution by a processor, the instructions when executed causing the processor to perform a method to obtain an error map for locations in a touch sensor, the method comprising:
   inputting, using the input device of the electronic appliance, a geometry for a touch sensor layout;
   inputting, using the input device of the electronic appliance, coordinates for a centroid of sensing elements in the touch sensor layout;
   inputting, using the input device of the electronic appliance, a touch geometry;
   selecting, using the input device of the electronic appliance, a plurality of test points on the touch sensor layout;
   generating, by the processor of the electronic appliance, a calculated touch location for each of the plurality of test points;
   generating, by the processor of the electronic appliance, an error map from the calculated touch locations and the test points;
   generating, by the processor of the electronic appliance, an error measure from the error map;
   displaying, on a display device coupled to the electronic appliance, the generated error map and the generated error measure; and
   adjusting, using the input device of the electronic appliance, the geometry for the touch sensor layout if the error measure is larger than a tolerance value.

2. The method of claim 1, wherein inputting the geometry for the touch sensor layout comprises inputting a geometry including sensing elements having interlaced, non-overlapping shapes, and each sensing element having a centroid.

3. The method of claim 2, wherein adjusting the geometry for the touch sensor layout comprises:
   modifying a shape of at least one of the sensing elements.

4. The method of claim 3, wherein modifying a shape of at least one of the sensing elements comprises modifying the shape of at least one adjacent sensing element so that a gap between the at least one sensing element and the adjacent sensing element remains nearly constant.

5. The method of claim 2, wherein adjusting the geometry for the touch sensor layout comprises:
   modifying a location of the centroid of at least one of the sensing elements.

6. The method of claim 1, wherein generating a calculated touch location for each of the plurality of test points comprises:
   obtaining overlap proportions from the touch geometry and a plurality of sensing elements in the touch sensor layout on at least one of the test points on the touch sensor layout;

determining a first two-dimensional touch location by an average of the centroid locations of the plurality of sensing elements weighted by the obtained overlap proportions;

determining complementary factors using the determined first two-dimensional touch location;

obtaining a second two-dimensional touch location by an average of locations of each of a plurality of sensing elements weighted by the overlap proportions and the complementary factors.

7. The method of claim 1, wherein generating an error map from the calculated touch locations and the test points comprises:

plotting coordinates of the test points on a two-dimensional frame; and plotting a two dimensional error vector anchored at each of the test points plotted on the two-dimensional frame.

8. The method of claim 7, wherein the two dimensional error vector anchored at each of the test points is obtained by determining a difference between the calculated touch location and the test point.

9. The method of claim 1, wherein generating an error map from the calculated touch locations and the test points comprises:

plotting the magnitude of the two dimensional error vectors as a contour map which may be color coded or gradient shaded according to the magnitude of the error.

10. The method of claim 1, wherein selecting a plurality of test points on the touch sensor layout comprises selecting a grid of points on the touch sensor layout, each point separated from its nearest neighbor by a predetermined finite distance.

11. The method of claim 1, wherein selecting a plurality of test points on the touch sensor layout comprises selecting a one-dimensional test trajectory on the touch sensor layout.

12. The method of claim 11, wherein the step of generating an error map from the calculated touch locations and the test points comprises plotting a trajectory of calculated locations next to a plot of the one-dimensional test trajectory.

13. The method of claim 11, wherein the one-dimensional test trajectory comprises a plurality of lines parallel to an axis in a two-dimensional frame.

14. The method of claim 11, wherein the one-dimensional test trajectory comprises a plurality of lines parallel to at least two orthogonal axes in a two-dimensional frame.

15. The method of claim 1 wherein generating, by the processor of the electronic appliance, an error measure from the error map comprises the use of a histogram obtained from the magnitude of the distances between the calculated touch locations and the test points in the error map.

* * * * *